US011220066B2

(12) United States Patent
McKinney et al.

(10) Patent No.: US 11,220,066 B2
(45) Date of Patent: *Jan. 11, 2022

(54) SPACER FOR USE IN PRECISION BONDING APPLICATIONS THAT PROVIDES ENHANCED SHEAR STRENGTH

(71) Applicant: Altec Industries, Inc., Saint Joseph, MO (US)

(72) Inventors: Ryan J. McKinney, Parkville, MO (US); Kyle E. Hoffmann, Saint Joseph, MO (US); Jace Hegg, St. Joseph, MO (US)

(73) Assignee: ALTEC INDUSTRIES, INC., Saint Joseph, MO (US)

( * ) Notice: Subject to any disclaimer, the term of this patent is extended or adjusted under 35 U.S.C. 154(b) by 50 days.

This patent is subject to a terminal disclaimer.

(21) Appl. No.: 16/663,034

(22) Filed: Oct. 24, 2019

(65) Prior Publication Data

US 2020/0055262 A1    Feb. 20, 2020

Related U.S. Application Data

(63) Continuation-in-part of application No. 15/722,718, filed on Oct. 2, 2017, now Pat. No. 10,456,991.

(60) Provisional application No. 62/403,418, filed on Oct. 3, 2016.

(51) Int. Cl.
*B29C 65/00* (2006.01)
*B29C 65/48* (2006.01)
*B29C 65/78* (2006.01)

(52) U.S. Cl.
CPC ............. *B29C 66/87* (2013.01); *B29C 65/48* (2013.01); *B29C 65/7826* (2013.01)

(58) Field of Classification Search
CPC ..... B29C 65/02; B29C 65/48; B29C 65/7826; B29C 66/87; F16B 11/006; F16B 2001/0092
USPC ................................ 156/391; 24/706; 33/495
See application file for complete search history.

(56) References Cited

U.S. PATENT DOCUMENTS

| | | | |
|---|---|---|---|
| 3,919,452 A | 11/1975 | Ettre et al. | |
| 3,947,311 A | 3/1976 | Jarchow et al. | |
| 4,346,918 A | 8/1982 | Lycan | |
| 4,512,436 A * | 4/1985 | Freudenthal | B66F 11/044 182/2.2 |
| 4,786,094 A | 11/1988 | Barton et al. | |
| 4,825,342 A * | 4/1989 | Gorski | B60Q 1/045 362/368 |
| 5,037,334 A | 8/1991 | Viselli et al. | |
| 5,328,087 A | 7/1994 | Nelson et al. | |
| 5,848,152 A * | 12/1998 | Slipy | H04M 1/0216 379/433.13 |
| 6,383,843 B1 | 5/2002 | Foong et al. | |
| 6,824,038 B2 | 11/2004 | Bahry et al. | |
| 6,826,928 B2 | 12/2004 | Berg et al. | |

(Continued)

*Primary Examiner* — Sonya M Sengupta
(74) *Attorney, Agent, or Firm* — Neo IP

(57) ABSTRACT

A spacer-locator with integrated locator pins and spacer tabs for use in joining applications. The spacer-locator provides consistent and accurate spacing between mating surfaces and the locator pins provide enhanced location control of the joining components while providing a mechanical advantage to the shear strength at the joint. Also, a spacer-locator for joining at least two objects along mating surfaces, the spacer-locator constraining at least two degrees of freedom for the objects to be joined.

21 Claims, 30 Drawing Sheets

(56) References Cited

U.S. PATENT DOCUMENTS

| | | |
|---|---|---|
| 8,040,638 B2 | 10/2011 | Raymond |
| 8,367,239 B2 | 2/2013 | Hermann |
| 8,481,191 B2 | 7/2013 | Hermann |
| 9,550,475 B1 * | 1/2017 | Walker .................... B66C 23/80 |
| 2004/0016790 A1 * | 1/2004 | Bahry .................... B25B 27/16 |
| | | 228/49.3 |
| 2006/0049669 A1 | 3/2006 | Yamamoto |
| 2008/0024926 A1 | 1/2008 | Raymond |
| 2009/0103164 A1 * | 4/2009 | Fijol ..................... G02B 26/02 |
| | | 359/290 |
| 2010/0136396 A1 | 6/2010 | Hermann et al. |
| 2013/0078494 A1 | 3/2013 | Hermann |
| 2016/0037921 A1 * | 2/2016 | Benthien ............... A47B 91/08 |
| | | 248/188.9 |
| 2018/0093425 A1 * | 4/2018 | McKinney .............. B29C 66/87 |

* cited by examiner

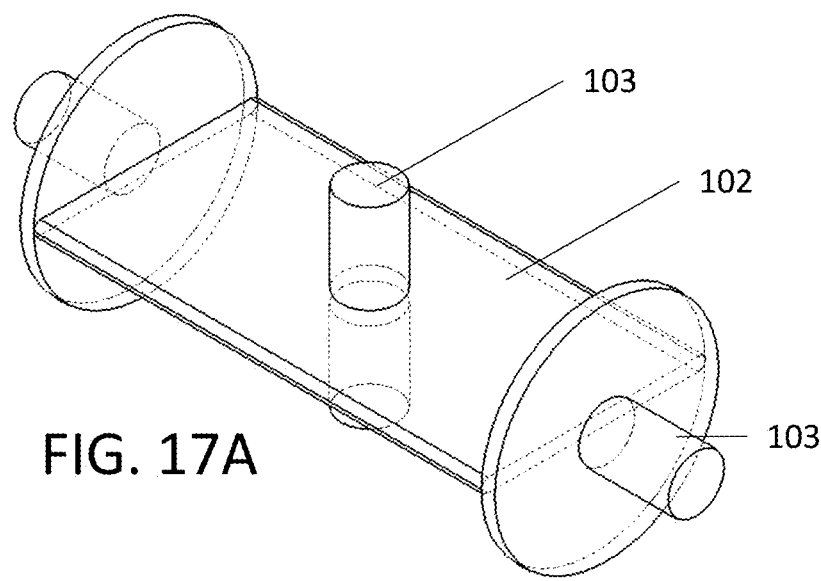
FIG. 17A
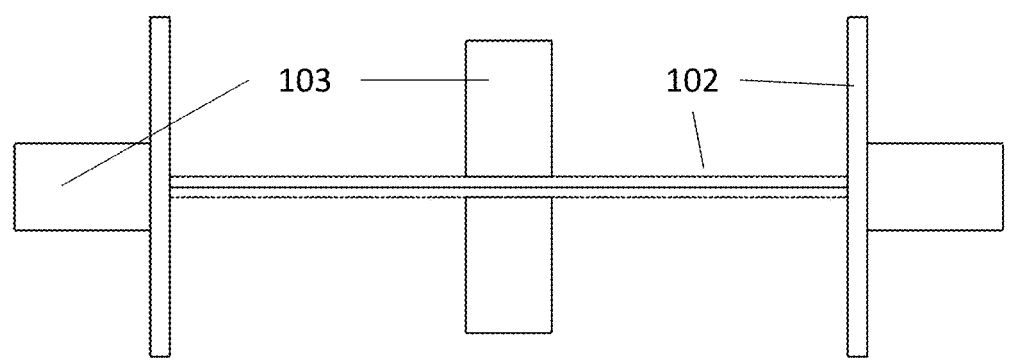
FIG. 17B
FIG. 17C
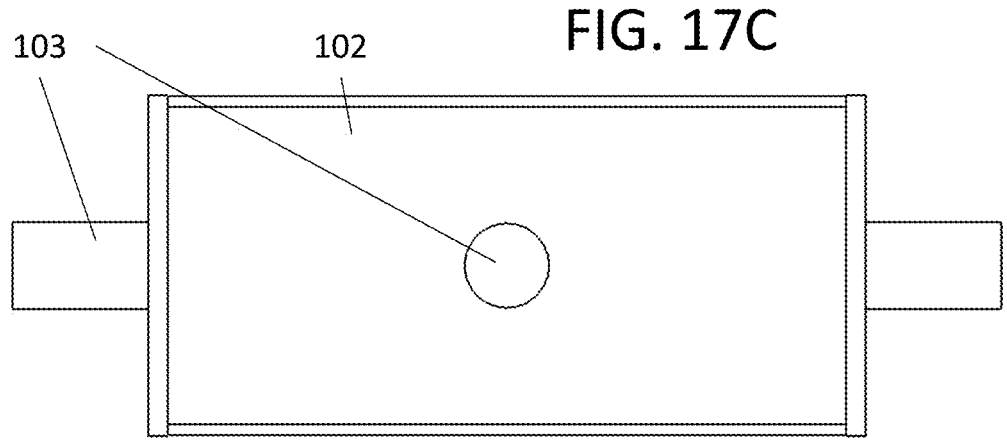

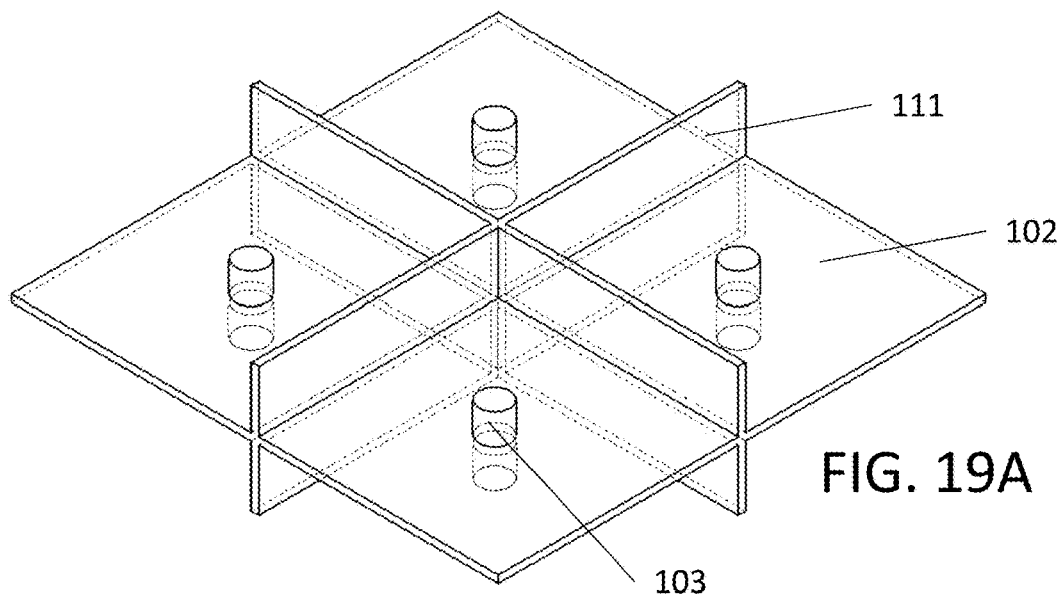
FIG. 19A
FIG. 19B
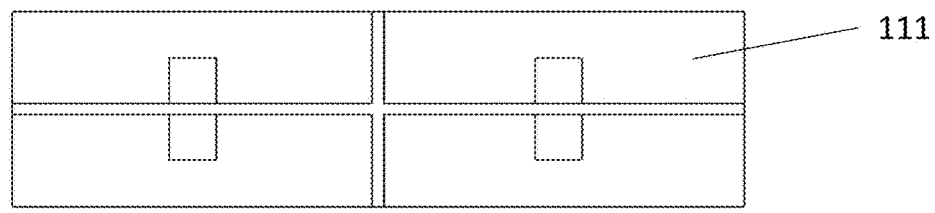
FIG. 19C
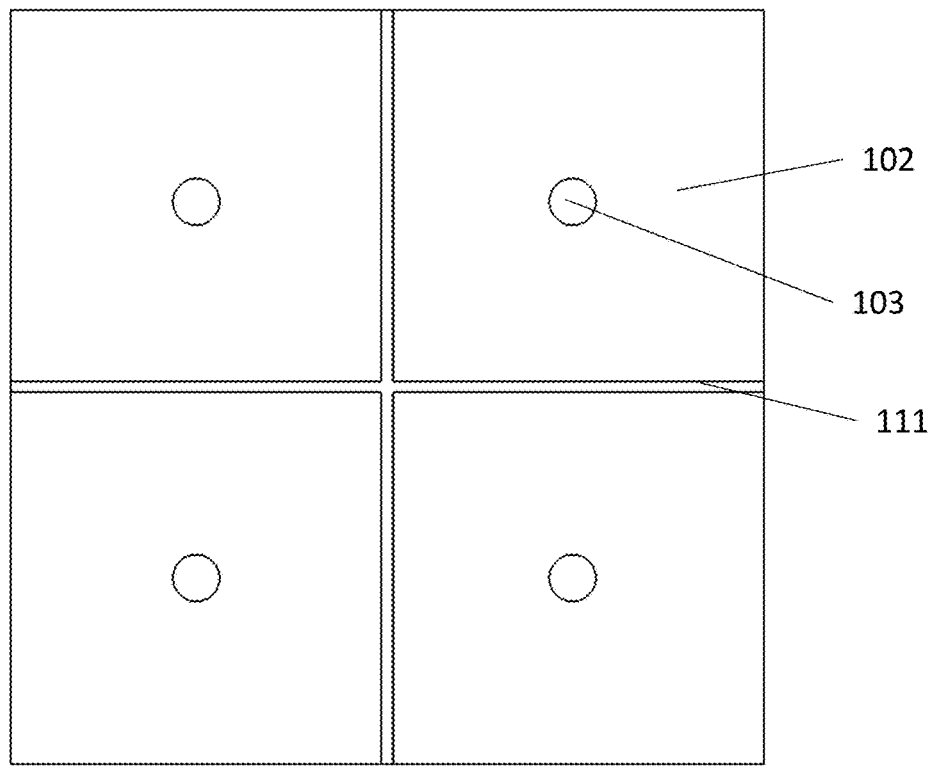

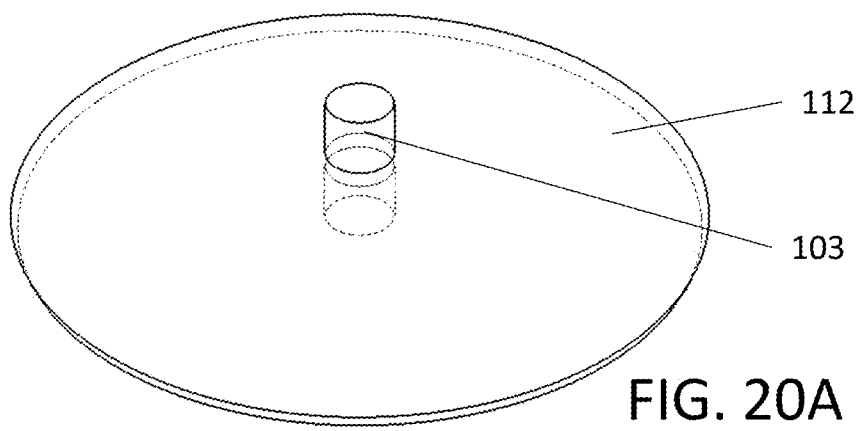
FIG. 20A
FIG. 20B
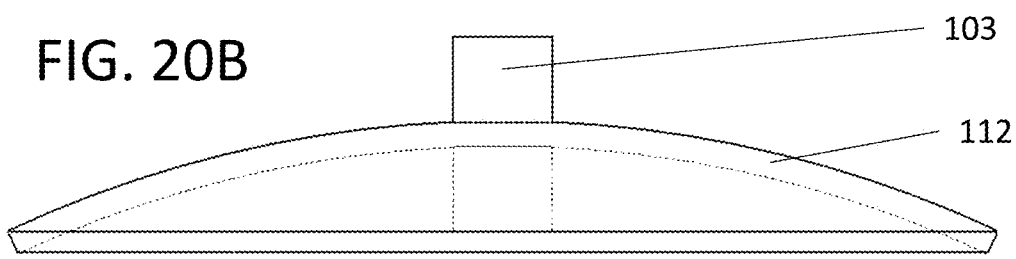
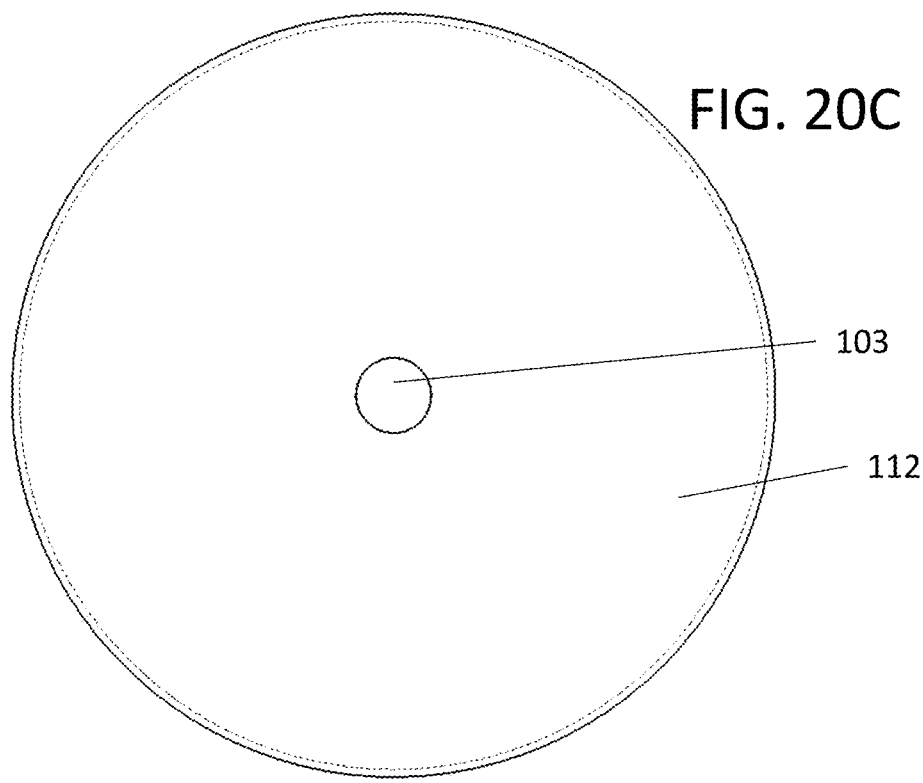
FIG. 20C

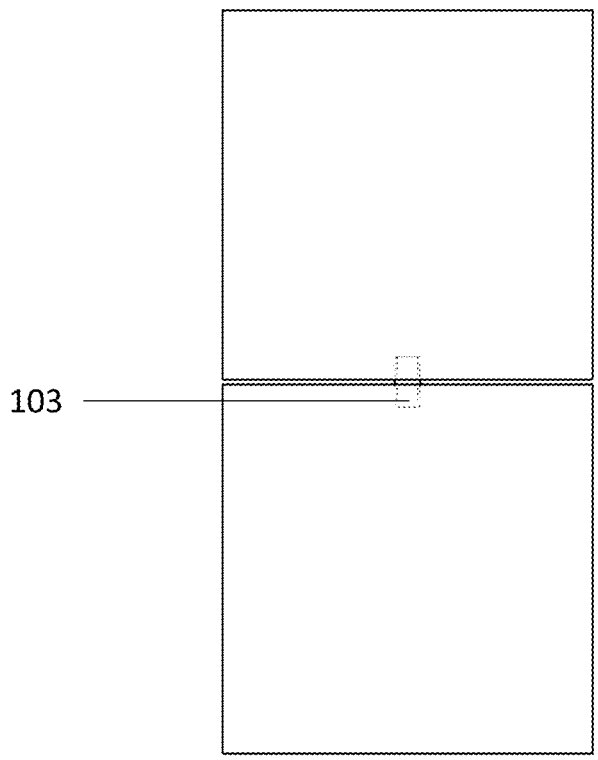
103    FIG. 21A
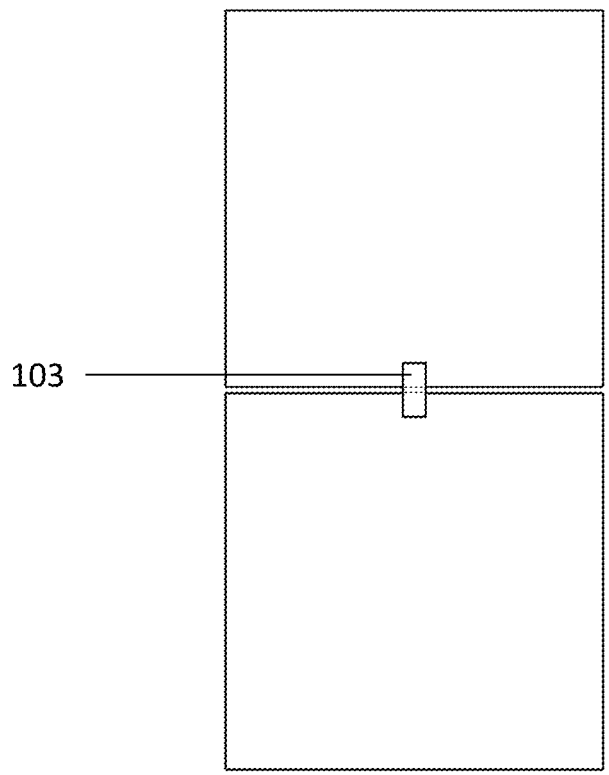
103    FIG. 21B

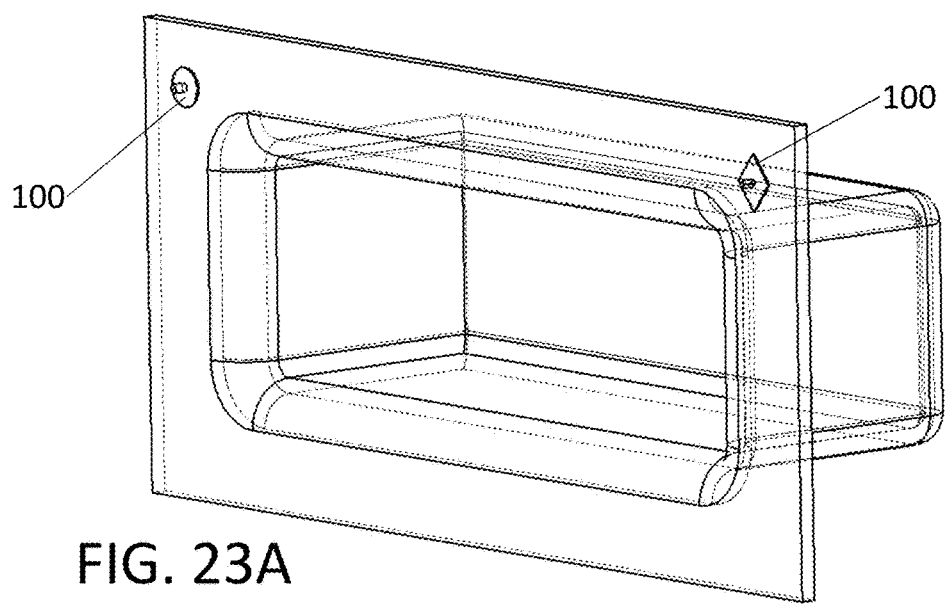
FIG. 23A
FIG. 23B
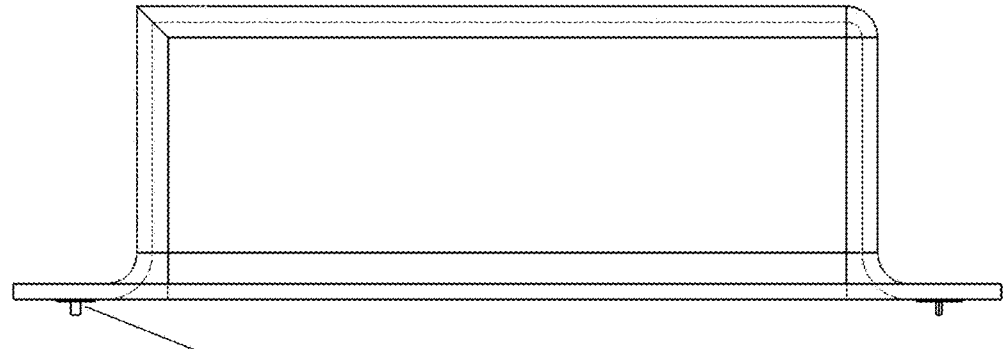
FIG. 23C
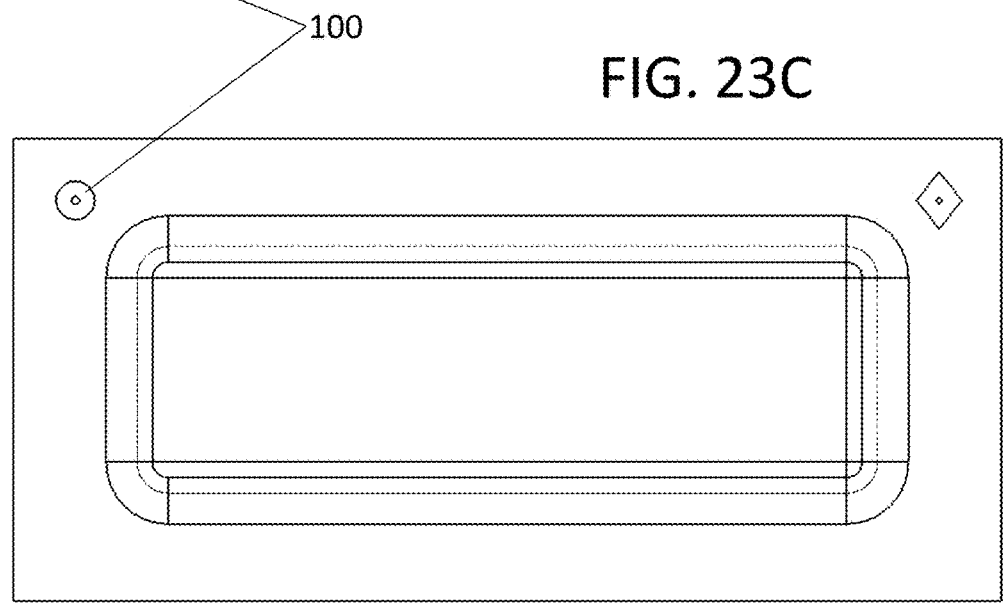

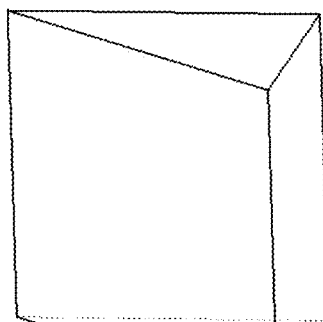
FIG. 24A
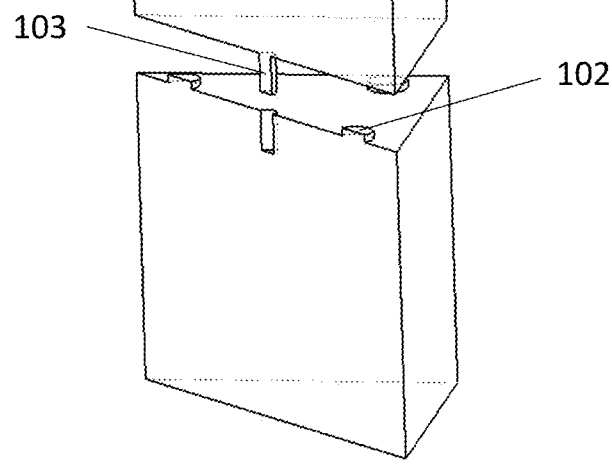
FIG. 24B
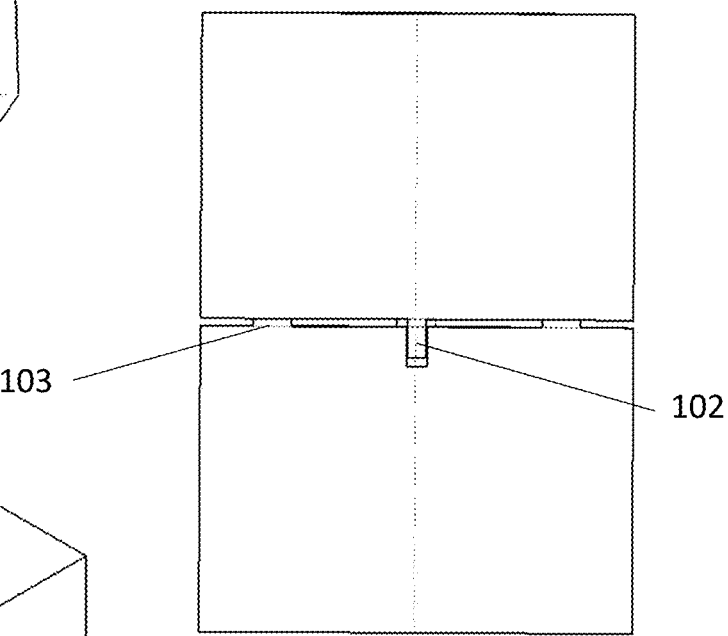
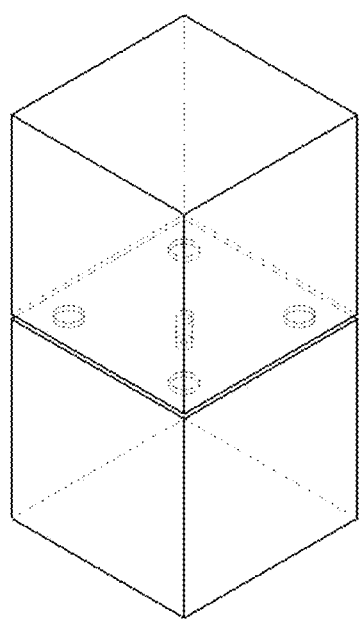
FIG. 24C

SPACER FOR USE IN PRECISION BONDING APPLICATIONS THAT PROVIDES ENHANCED SHEAR STRENGTH

CROSS REFERENCES TO RELATED APPLICATIONS

This application is related to and claims priority from the following U.S. patent applications. This application is a continuation-in-part of U.S. Non-Provisional application Ser. No. 15/722,718, now U.S. Pat. No. 10,456,991, filed Oct. 2, 2017, which claims priority to U.S. Provisional Application No. 62/403,418, filed Oct. 3, 2016, each of which is incorporated herein by reference in its entirety.

BACKGROUND OF THE INVENTION

1. Field of the Invention

The present invention relates to spacers, and more specifically to spacers with locators used in a spacing and locating process.

2. Description of the Prior Art

It is generally known in the prior art to utilize spacers to ensure adhesive thickness in bonding applications.

Prior art patent documents include the following:

U.S. Pat. No. 4,346,918 for pipe spacer used in welding by inventor Lycan, filed May 7, 1979 and issued Aug. 31, 1982, describes a split ring pipe spacer used to separate a pipe from the fitting shoulder during welding. The spacer has yieldable protrusions for the purpose of maintaining proper spacing and alignment of the pipe and fitting during welding.

U.S. Pat. No. 8,040,638 for self-fixturing pivoting actuator by inventor Raymond, filed Jul. 27, 2006 and issued Oct. 18, 2011, describes a rotary actuator arm assembly for positioning a transducer over a data track of at least one rotating magnetic disk. The actuator includes self-contained spacers with semi-kinetic mounting features to accurately locate and secure a set of self-aligning components, thereby eliminating azimuth alignment problems created by conventional assembly procedures.

U.S. Pat. No. 3,919,452 for precision bonding system by inventor Ettre et al., filed Oct. 23, 1973 and issued Nov. 11, 1975, describing a sealing system for bonding which incorporates a sealing cement and at least three spacers disposed within said sealing cement, allowing two members to be easily and securely bonded together with a precise separation gap between them and with the lateral flow of the sealing cement precisely controlled. Preferably, spherical spacers are employed having a diameter equal to the spacing desired between the members being joined, and the sealing cement incorporates a thermal expansion compatible with the thermal expansion of the members being joined.

U.S. Pat. No. 4,825,342 for vehicle headlamp assembly locator by inventor Gorski, filed May 27, 1988 and issued Apr. 25, 1989, describing a vehicle headlamp assembly locator for proper positionment of a vehicle headlamp assembly in a vehicle in alignment with the hood of the vehicle. The locator includes an elongated spacer element for determining the horizontal distance between a designated portion of the vehicle headlamp assembly and a forward portion of the vehicle hood. An upright spacer element is provided to position the elongated spacer element in the desired vertical position.

US Patent Application No. 2009/0103164 for spacers for maintaining display apparatus alignment by inventor Fijol et al., filed on Oct. 19, 2007, disclosing methods and apparatus for forming a display apparatus. According to one aspect of the invention, the display apparatus includes a first substrate having an aperture layer formed thereon, a light guide for guiding light towards the aperture layer, a plurality of MEMS light modulators for modulating light passing through the aperture layer from the light guide, and a spacer substantially surrounding the light guide for keeping the light guide and the first substrate a predetermined distance apart from one another, thereby forming a gap between the first substrate and the light guide. Alternatively or in addition, the first substrate may have a control matrix formed thereon.

U.S. Pat. No. 4,786,094 for mounting clip including break-away spacer element by inventor Barton et al., filed Oct. 6, 1987 and issued on Nov. 11, 1988, discloses a clip mounting structure which is attachable to a vehicle body without use of fixtures. This is done by initially providing the mounting structure with spacer tabs. The spacer tabs are positioned with respect to an available reference location, such as another previously mounted molding or panel. The tabs are break-away structures and are removed after the mounting structure is secured in place. The clip mounting structure is then used to secure a molding in place.

U.S. Pat. No. 3,947,311 for method and apparatus for cementing in the manufacture of double-pane insulating glass units by inventor Jarchow et al., filed on Nov. 20, 1973 and issued on Mar. 30, 1976, discloses a method to double or plural pane insulating packages by placing panes together with a spacer, thereby leaving an interspace at the periphery into which cement is injected. Two nozzles are used to inject cement into the interspace, starting from a common starting region and working in opposite directions around the periphery to a common terminal point. Conveyors and control systems are provided to mechanize the process.

U.S. Pat. No. 5,328,087 for thermally and electrically conductive adhesive material and method of bonding with same by inventor Nelson, filed Mar. 29, 1993 and issued on Jul. 12, 1994, describing a thermally and electrically conductive adhesive material comprising a hardened adhesive, and a non-solidified filler containing a liquid metal dispersed in separate spaced regions of the adhesive. The hardened adhesive provides a mechanical bond whereas the filler provides continuous thermal and electrical metal bridges, each bridge extending through the adhesive and contacting the bonded surfaces. The method includes (a) dispersing a filler containing a liquid metal into an unhardened adhesive, (b) contacting the unhardened adhesive and the filler in non-solidified state to the surfaces resulting in separate spaced regions of the non-solidified filler contacting both surfaces, and (c) hardening the adhesive.

U.S. Pat. No. 6,383,843 for using removable spacers to ensure adequate bondline thickness by inventor Foong et al., filed Apr. 4, 2000 and issued May 7, 2002, describing a method for die bonding a semiconductor device to a substrate, which method provides adequate and consistent bondline thickness and assures that the die is spaced from the substrate a predetermined amount. Embodiments include removably attaching a flexible spacer of a predetermined thickness, such as a strip of paper or plastic, to the bonding pad of a substrate, such as an organic lead frame, so that it partially covers the bonding pad while leaving other parts of the bonding pad exposed. Die attach material, such as epoxy paste, is then applied to the exposed areas of the bonding pad, and a die is placed over the bonding pad in contact with the epoxy and the spacer. Due to the presence of the spacer, the die cannot sink when it is placed on the epoxy paste, resulting in a consistent bondline thickness equal to the spacer thickness. Thereafter, the epoxy paste is cured and the spacer removed, leaving a gap between the die and the lead frame of the predetermined spacer thickness, which is underfilled with plastic encapsulant material when the die is encapsulated. Thus, an ideal bondline thickness is consistently achieved, improving reliability at minimal additional cost, and no additional materials are introduced into the finished device which could adversely affect reliability.

U.S. Pat. No. 6,826,928 for methods for positioning and bonding elements in substrates by inventor Berg et al., filed on Mar. 19, 2002 and issued Dec. 7, 2004, describing a device and technique for placing and bonding identical elements to holes in a substrate where spacer balls and a reference surface are used to achieve the desired accuracy.

U.S. Pat. No. 6,824,038 for method and tool for aligning piping components by inventor Bahry et al., filed Jul. 23, 2002 and issued Nov. 30, 2004, describing a pipe aligning tool for providing proper alignment and spacing between two piping components to be welded together in an end to end abutted relationship. The tool includes a spacer lying in a single plane for positioning between the ends of the piping components to provide the proper spacing. A pipe locator in the form of two projections, projects perpendicularly outwardly from each side of the spacer for concentric alignment of piping components on opposing sides of the spacer when abutted with the respective pipe locators. The simple construction of the tool permits two piping components to be both concentrically aligned and properly spaced for welding in a simple task which can be manually performed without depending upon visual alignment by the user.

U.S. Pat. No. 8,367,239 for cell separator for minimizing thermal runaway propagation within a battery pack by inventor Hermann, filed Aug. 8, 2009 and issued Feb. 5, 2013, describing a spacer assembly for use with a cell mounting bracket in a battery pack. The spacer assembly, comprised of one or more spacers, maintains the positions of the batteries within the battery pack during a thermal event and after the cell mounting bracket loses structural integrity due to the increased temperature associated with the thermal event. By keeping the battery undergoing thermal runaway in its predetermined location within the battery pack, the minimum spacing between cells is maintained, thereby helping to minimize the thermal effects on adjacent cells while ensuring that the cooling system, if employed, is not compromised. As a result, the risk of thermal runaway propagation is reduced.

SUMMARY OF THE INVENTION

The present invention relates to a spacer-locator operable to be used between surfaces to be joined that provides for spacing control, location control, and additional mechanical strength against shear stress/fatigue.

It is an object of this invention to provide a spacer-locator for controlled spacing and location of two or more objects to be joined. It is a further object of this invention to provide a spacer-locator that provides a controlled thickness of an adhesive to be used in bonding. It is another object of this invention to provide a spacer-locator that incorporates the material characteristics of the joined materials including, but not limited to, corrosion resistance, conductivity, etc. It is yet another object of the present invention to provide a spacer-locator that provides enhanced location control of bonded surfaces, thereby lowering manufacturing costs. It is a further object of the present invention to provide a spacer-locator that provides enhanced shear strength of at least two bonded surfaces. It is a further object of the present invention to provide a spacer-locator that provides anti-rotation benefits to a joint.

One embodiment of the present invention provides a spacer-locator that provides for a controlled thickness of an adhesive to be used in bonding and maintaining the bond between two bonded surfaces.

Another embodiment of the present invention provides a spacer-locator with locator pins manufactured with the same material as the bonded surfaces.

Yet another embodiment of the present invention provides a spacer-locator with strength enhancing locator pins.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 17A illustrates a perspective view of a spacer-locator that aligns 4 surfaces according to one embodiment of the present invention.

FIG. 17B illustrates a side view of the embodiment illustrated in FIG. 17A.

FIG. 17C illustrates a top view of the embodiment illustrated in FIGS. 17A and B.

FIG. 19A illustrates a perspective view of a spacer-locator that aligns 8 mating surfaces according to one embodiment of the present invention.

FIG. 19B illustrates a side view of the embodiment illustrated in FIG. 19A.

FIG. 19C illustrates a top view of the embodiment illustrated in FIGS. 19A and B.

FIG. 20A illustrates a perspective view of a spacer-locator that aligns a concave and a convex surface according to one embodiment of the present invention.

FIG. 20B illustrates a side view of the embodiment illustrated in FIG. 20A.

FIG. 20C illustrates a top view of the embodiment illustrated in FIGS. 20A and B.

FIG. 21A illustrates a transparent side view of two objects held in position by a spacer-locator with a cylinder locator and no spacer tabs according to the present invention.

FIG. 21B illustrates a cross-sectional view of the embodiment illustrated in FIG. 21A.

FIG. 23A illustrates a perspective view of a spacer-locator that is integrated with one of the objects to be joined.

FIG. 23B illustrates a side view of the embodiment illustrated in FIG. 23A.

FIG. 23C illustrates a top view of the embodiment illustrated in FIGS. 23A and B.

FIG. 24A illustrates a cross-sectional, transparent, exploded perspective view of two objects held in position with a locator pin on one object and spacer tabs on the opposing object.

FIG. 24B illustrates a cross-sectional side view of the embodiment illustrated in FIG. 24A.

FIG. 24C illustrates a transparent perspective view of the embodiment illustrated in FIGS. 24A and B.

DETAILED DESCRIPTION

Figure 1:
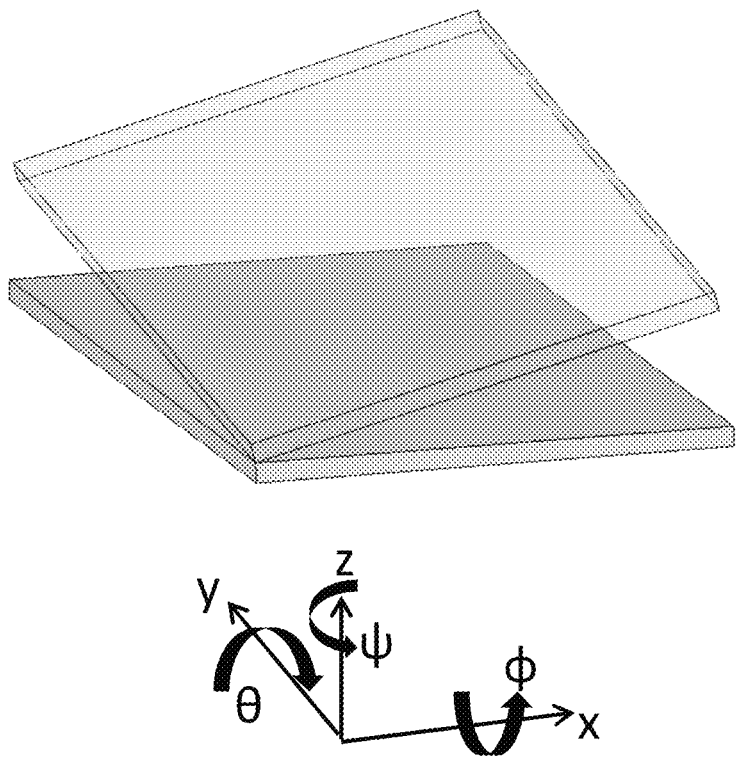
FIG. 1 is a perspective drawing showing the x-axis, y-axis, z-axis and theta, phi and psi angles for two objects to be juxtaposed at their mating surfaces.

The present invention is generally directed to a spacer-locator for use in spacing and locating two objects. The spacer-locator provides for spacing and locating two objects to be chemically or physically affixed to one another, such as with adhesive, by welding, by soldering, by vacuum, by mechanical fastening and the like.

In one embodiment, the present invention includes a spacer-locator that provides for a controlled thickness of an adhesive to be used in bonding and maintaining the bond between two bonded surfaces.

In another embodiment, the present invention includes a spacer-locator manufactured from the same material as the bonded surfaces.

In yet another embodiment, the present invention includes a spacer-locator including locating pins that provide additional shear strength.

In yet another embodiment, the present invention includes a spacer-locator that prevents rotation between two mating surfaces.

Typical prior art spacers generally provide adhesive thickness tolerance or locational tolerance of adhered surfaces. The prior art does not disclose, teach, or suggest the use of a spacer-locator that provides for controlled spacing to be used in joining and maintaining the joint between two mating surfaces, enhanced positional tolerance for ease of assembly, and enhanced structural rigidity of joint by incorporating locator pins which provide a mechanical advantage against shear stress.

The present invention is directed to a method of joining two or more surfaces and at least one spacer-locator with locator pins that provide location control and a mechanical advantage against shear stress. The method of the present invention includes locating holes in the two or more surfaces. The locating holes are created by drilling or, alternatively, the locating holes are created through a different process, by way of example and not limitation, incorporating the negative space into the design of the two or more surfaces. The method of the present invention further includes placing spacer-locators into the locating holes of one or more of the two or more surfaces. The method of the present invention further includes applying adhesive or other joining agent to one or more of the two or more surfaces. The present invention further includes the aligning of corresponding locating holes on each of the two or more surfaces that are being joined and pressing the surfaces together, thereby joining the surfaces and the at least one spacer's locator pins, aligning the surfaces in relation to one another. Alternatively, locator pins are placed in the corresponding locator holes, the two or more surfaces are aligned and pressed together, and the joining agent is subsequently injected into the gap between the two or more surfaces.

In one embodiment, the invention is a spacer-locator of a predetermined thickness that is capable of withstanding the pressure applied during a joining process, thereby maintaining the separation of the mating surfaces while ensuring controlled thickness of the joining agent between the mating surfaces. The spacer-locator preferably incorporates pins which serve as locators for aligning the mating surfaces and provide additional shear strength to the joint after the joining process has been completed. In an alternative embodiment, the spacer-locator includes a spacer body, to which the locator pins are reversibly or irreversibly attachable.

The surfaces of the spacer-locator are created with different tolerances, depending on the use of the spacer. This reduces manufacturing costs associated with high-tolerance surfaces that are not critical to the bonding application. By way of example and not limitation, the locator pin sizing is manufactured to a tighter tolerance or looser tolerance depending on whether positioning jigs are used during the bonding process of the two surfaces. Additionally, the spacer tab thickness is manufactured to a tighter tolerance or looser tolerance depending on the importance of the adhesive thickness or joint separation. By way of example and not limitation, the tolerance ranges from 1% to 15% of the specified spacer tab thickness.

In a preferred embodiment of the present invention, the locator pins act as a functional replacement to the positioning jigs currently needed to align components during the joining process. The more complex the final assembly, the larger the impact the locator pins have in reducing the manufacturing cost of the finished product. By way of example and not limitation, bonding a step to a platform requires numerous unique jigs to maintain the positional tolerance during the adhering process. An example of bonding a step to a platform includes, but is not limited to, the step attached to an elevated platform used with utility trucks. Implementing tight tolerance for a spacer-locator with locator pins provides the same benefits of the jig without the added expense of storage and maintenance of numerous jig assemblies. This provides for lower manufacturing costs and subsequently higher profits.

In a preferred embodiment of the present invention, the spacer tabs and locator pins are made of the same material as the mating surfaces. This maintains uniform material characteristics throughout the entire assembly, including by way of example and not limitation, conductivity, corrosion resistance, and aesthetic qualities. Suitable materials include, but are not limited to, fiberglass, plastics, metals, resins, epoxy, composite laminate, and/or ceramic.

The spacer-locator is designed to prevent rotation of bonded surfaces. In one embodiment of the present invention, rotation is prevented between joined surfaces by incorporating two spacer-locators of the present invention on the same mating surfaces. In an alternative embodiment of the present invention, rotation is prevented between mating surfaces by incorporating an anti-rotation feature into the spacer tab.

Thus, the spacer-locator provides for controlling the degrees of freedom between two or more surfaces. For juxtaposed planar surfaces that are to be glued together, there are six possible degrees of freedom with respect to one another (six relative degrees of freedom): the x-, y- and z-axes and the theta, phi, and psi angles (FIG. 1). The x-axis and y-axis are along the plane of the first mating surfaces and the z-axis traverses the interface of the first mating surfaces. In the case of planar surfaces, the z-axis is perpendicular to the plane of the mating surfaces. The psi angle is in the plane of the first mating surfaces (around the z-axis); the phi angle is around the x-axis, and the theta angle is around y-axis. Adding a locator pin constrains two axes (x- and y-axes) and two rotational degrees of freedom (phi and theta) and therefore reduces the degrees of freedom to two. Adding an anti-rotation component constrains rotation around the z-axis (psi angle), removes another degree of freedom and reduces the degrees of freedom to one. Adding a spacer tab partially constrains a fifth degree of freedom (z-axis) and additionally constrains the phi and psi angles.

Thus, a spacer-locator according to the present invention can constrain two objects to two or one degrees of freedom and can partially constrain the last degree of freedom.

Referring now to the drawings in general, the illustrations are for the purpose of describing preferred embodiments of the invention and are not intended to limit the invention thereto.

Figure 2A:
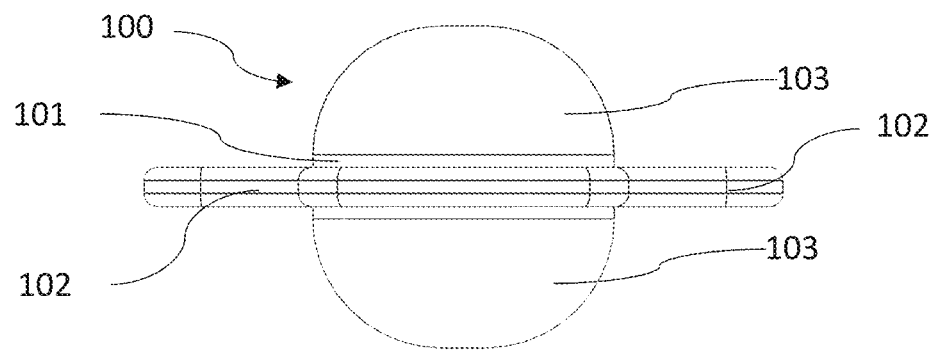
FIG. 2A illustrates a side view of a spacer-locator with three spacer tabs and two rounded locator pins according to one embodiment of the present invention.

FIG. 2A is a side view that illustrates a preferred embodiment of the present invention. The spacer-locator 100 includes a spacer body 101, spacer tabs 102, and locator pins 103. The spacer body 101 acts as the core of the spacer-locator 100, and acts as a mounting surface for the spacer tabs 102 and the locator pins 103. The spacer tabs 102 lay on a plane and extend outward perpendicularly from the direction of the locator pins 103 and outwardly from the spacer body 101. Alternatively, the spacer body 101, spacer tabs 102, and locator pins 103 are formed from one piece of material. Alternatively, the locator pins 103 attach to the spacer body 101 through threaded members. Alternatively, the locator pins 103 attach to the spacer body 101 with adhesive.

In one embodiment, the spacer body is about 0.030" thick. Alternatively, the spacer body thickness is between 0.010" and 0.030". In another alternative embodiment, the spacer body thickness is between 0.030" and 0.1". In one embodiment, the spacer includes a smooth surface where the locator pin is mounted with adhesive. In another embodiment, the spacer body incorporates an internal threading for mechanical fastening of a locator pin.

In another embodiment of the present invention, the spacer tabs have a thickness of about 0.030". Alternatively, the spacer tab thickness is between 0.010" and 0.030". In another alternative embodiment, the spacer tab thickness is between 0.030" and 0.1". Alternatively, the spacer tab thickness is determined by the final adhesive thickness requirements between the bonded surfaces.

In one embodiment of the present invention, the spacer-locator, including the spacer tabs and locator pins are created from a single piece of material. By way of example and not limitation, the spacer-locator is formed, milled, molded, stamped, and/or 3-D printed as one piece.

In an alternative embodiment of the present invention, the spacer tabs and locator pins are made of a different material than the mating material based on the joining application. Preferably, the spacer tabs and locator pins are made of a material having a higher shear strength than the mating material and the mating agent. By way of example and not limitation, the shear strength of Methyl Methacrylate is approximately 3 ksi and the shear strength of carbon steel ranges from 36 to 120 ksi.

Alternatively, the spacer-locator is formed from at least two pieces of material. By way of example and not limitation, the spacer body is formed, milled, molded, stamped, and/or 3-D printed separately from the locator pins. Locator pins are then selected and attached to the spacer body depending on the requirements of the bonded assembly. Attachment of the locator pins to the spacer body occurs through mechanical fastening, by way of example and not limitation, through the utilization of threaded members. In one embodiment, the locator pins incorporate a threaded member with an external thread, and the spacer body incorporates a threaded member with internal threads. Alternatively, the spacer body incorporates external threads and the locator pins incorporates internal threads.

In another embodiment, the locator pins are attached with adhesive. Suitable adhesive includes, but is not limited to, laminates, hot adhesives, reactive adhesives, polyester-polyurethane resin, polyols-polyurethane resin, acrylic polymers-polyurethane resin, epoxy, methacrylate, and/or cyanoacrylate. In another embodiment the locator pins are attached through thermal bonding, including but not limited to, plastic welding, electric welding, tungsten arc welding and/or soldering. In another embodiment the locator pins are attached through the use of magnets within the locator pins and the spacer body. This modular design provides flexibility of the spacer-locator characteristics, thereby having the advantage of reduced costs as spacer-locators do not need to be custom-made for every bonding application.

Figure 2B:
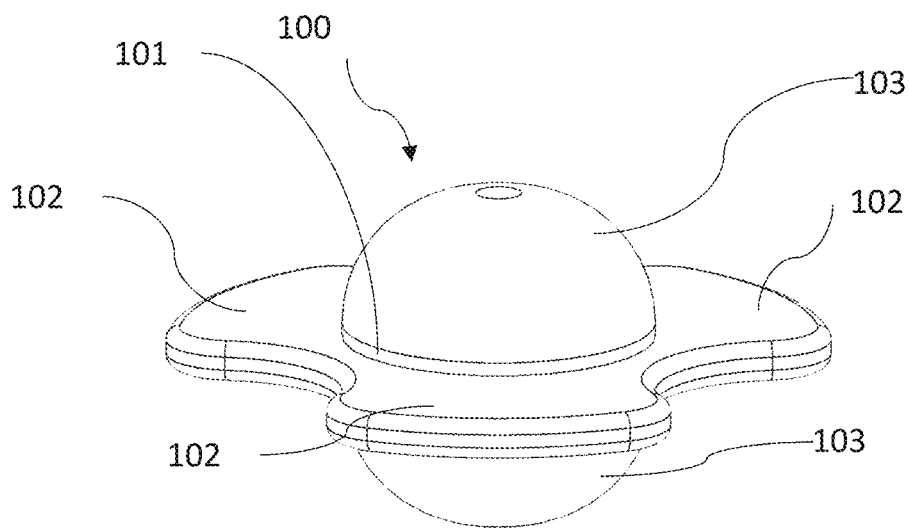
FIG. 2B illustrates a perspective view of the embodiment illustrated in FIG. 2A.

FIG. 2B is a perspective view of the spacer-locator embodiment illustrated in FIG. 2A.

Figure 2C:
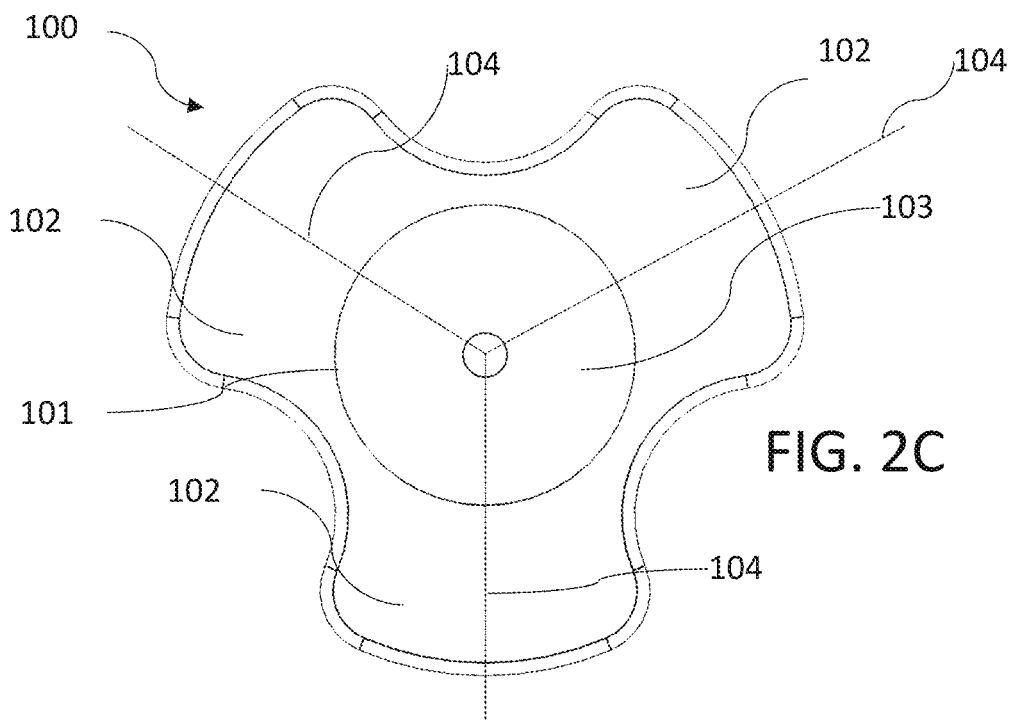
FIG. 2C illustrates a top view of the embodiment illustrated in FIGS. 2A and 1B.

FIG. 2C is a top view of the spacer-locator illustrated in FIGS. 2A and B, further showing the centerline of the spacer tabs 104. The spacer tabs 104 are offset randomly or non-randomly. For example, the offset of the centerline of the spacer tabs 104 is governed by an equation, wherein the equation is, by way of example and not limitation, 360 degrees divided by the number of spacer tabs. An example is shown in FIG. 2C, where the centerlines of the three spacer tabs are offset non-randomly by 120 degrees around the vertical.

In another embodiment of the present invention, the locator pins are sized and shaped according to the shear strength required of the assembly. Prior art spacers ultimately weaken the joint by displacing a portion of adhesive and providing no additional strength to the joint. The spacer-locator of the present invention addresses this weakness and improves upon the prior art by not only preventing the loss of strength at the joint by maintaining spacing, but by adding mechanical shear strength at the joint through the use of locator pins. The locator pins work in tandem with the shear strength associated with the joining agent. In certain embodiments of the present invention, the locator pins are shaped to maximize the shear strength of the joint. By way of example and not limitation, FIG. 3A shows one embodiment of the present invention where the locator pins are shaped and sized for their ability to provide shear strength to the joint.

Figure 3A:
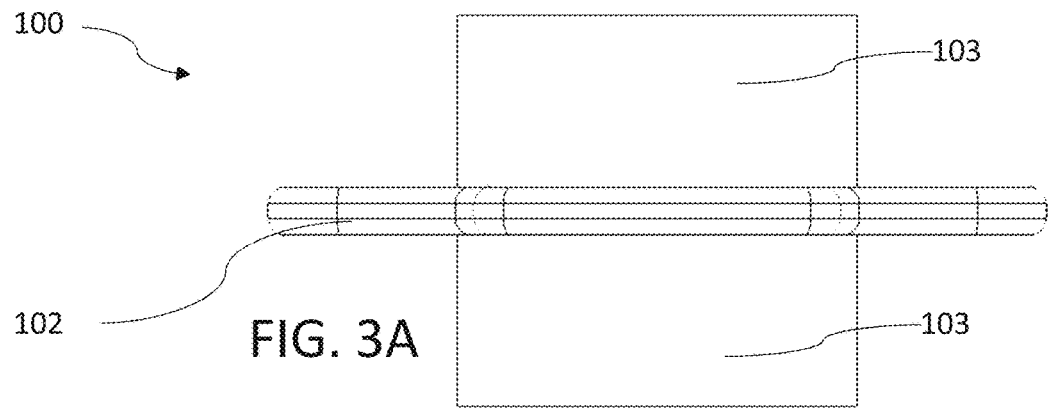
FIG. 3A illustrates a side view of a spacer-locator with three spacer tabs and two cylindrical locator pins according to one embodiment of the present invention.

FIG. 3A is a side view that illustrates an embodiment of the present invention. The spacer-locator 100 includes spacer tabs 102, and locator pins 103. The spacer tabs 102 act as the core of the spacer-locator 100, and are a mounting surface for the locator pins 103. The spacer tabs 102 lay on a plane and extend outward perpendicularly from the direction of the locator pins 103. The spacer tabs 102, and locator pins 103 are formed from one piece of material. Alternatively, the locator pins 103 attach to the spacer tabs 102 through threaded members. Alternatively, the locator pins 103 attach to the spacer tabs 102 with adhesive.

Figure 3B:
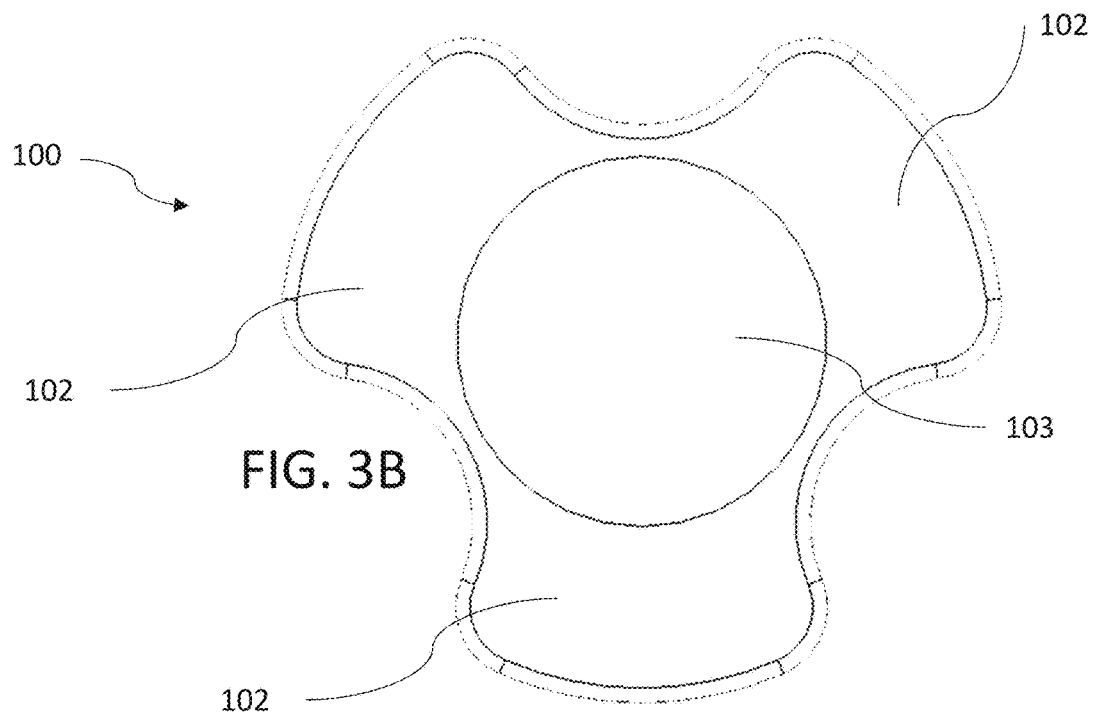
FIG. 3B illustrates a top view of the embodiment illustrated in FIG. 3A.

FIG. 3B is a top view of the spacer-locator embodiment illustrated in FIG. 3A.

Figure 3C:
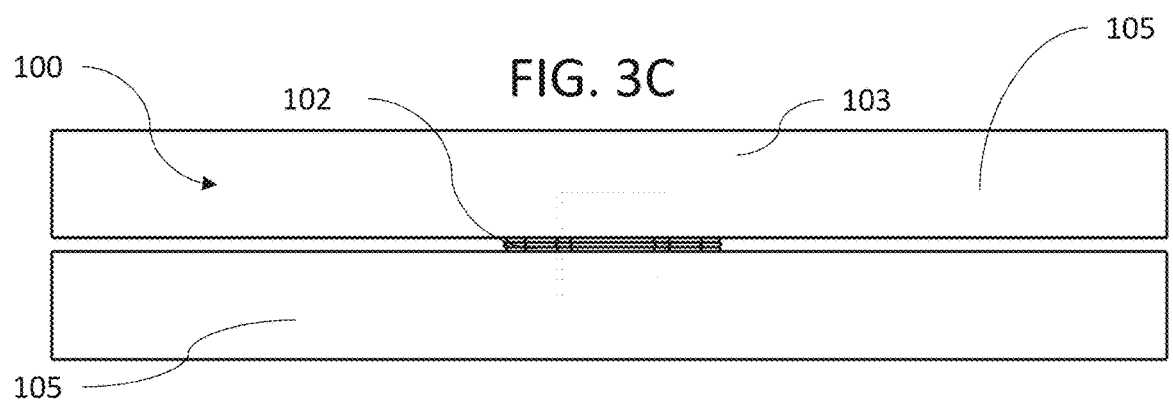
FIG. 3C illustrates a side view of the embodiment illustrated in FIGS. 3A and B, wherein the spacer-locator is included in a bonding assembly.

FIG. 3C is a side view of the spacer-locator embodiment illustrated in FIGS. 3A and B, further showing an example of bonding surfaces 105.

Figure 4A:
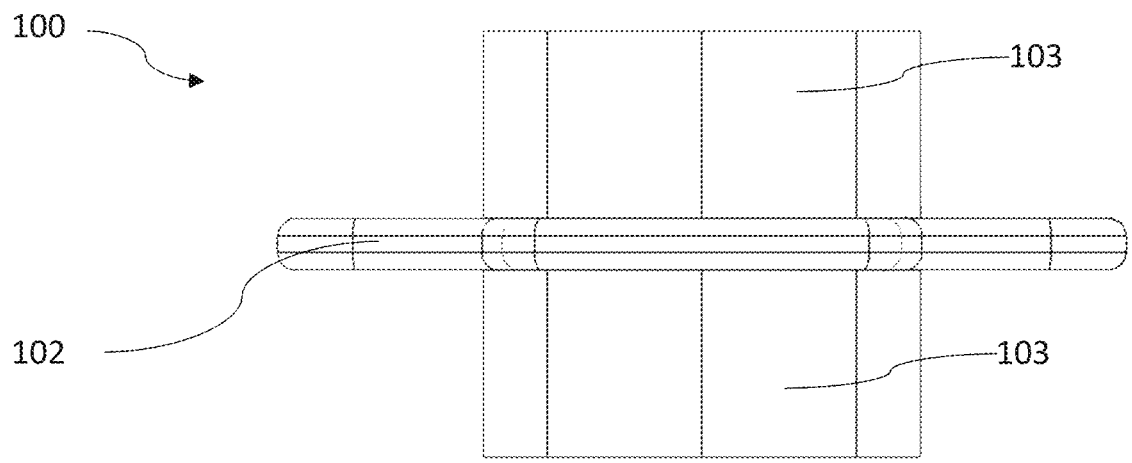
FIG. 4A illustrates a side view of a spacer-locator with three spacer tabs and two octagonal locator pins according to one embodiment of the present invention.

FIG. 4A is a side view of the spacer-locator embodiment in FIG. 3A, wherein the locator pins 103 are hexagonal in shape. The hexagonal shape of the locator pins 103 advantageously prevents two substrates from rotating about the spacer-locator if only 1 spacer-locator is used in bonding the two substrates.

Figure 4B:
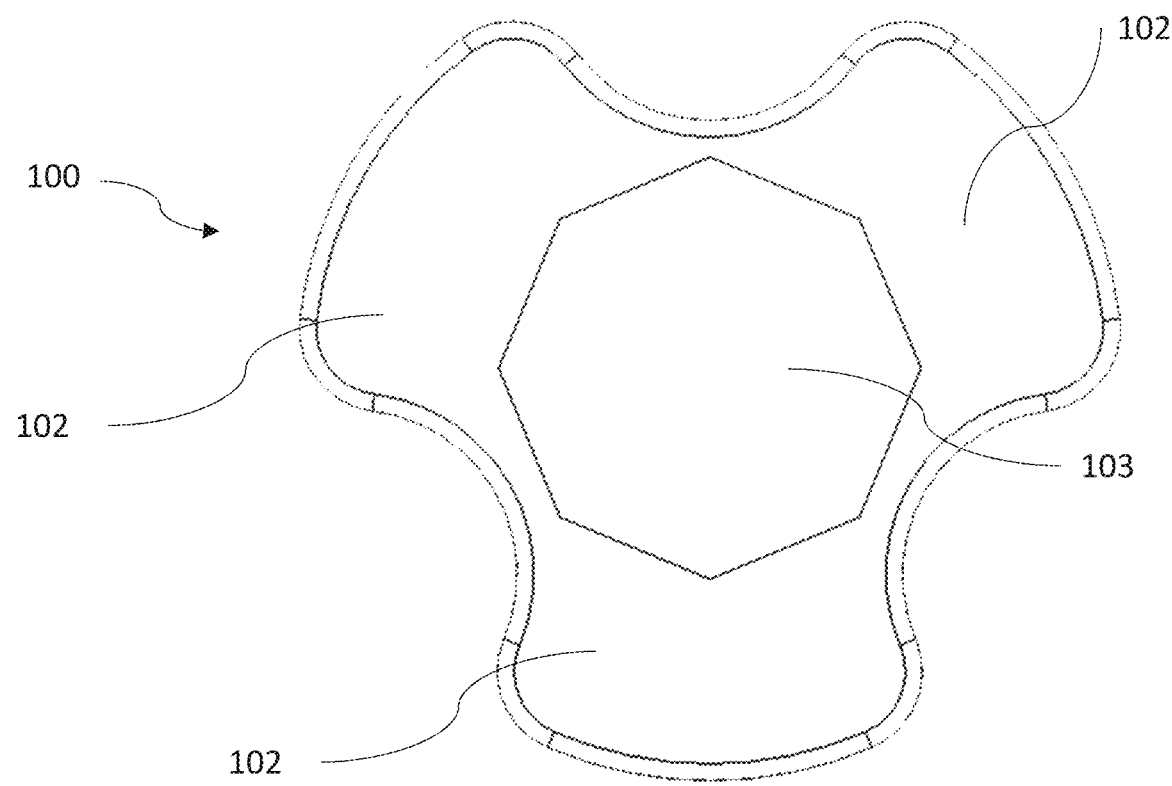
FIG. 4B illustrates a top view of the embodiment illustrated in FIG. 4A.

FIG. 4B is a top view of the spacer-locator embodiment in FIG. 3B, wherein the locator pins 103 are hexagonal in shape.

In another embodiment the spacer-locator contains two spacer tabs. In another alternative the spacer-locator contains more than two spacer tabs. In another embodiment the spacer-locator contains between three and eight spacer tabs. Alternatively, the spacer-locator contains one spacer tab.

In a preferred embodiment of the present invention, the spacer's locator pins incorporate anti-rotation features, thereby eliminating the need for the second spacer-locator in an assembly. The incorporated anti-rotation feature provides the benefit of reducing cost, weight, and assembly time.

Figure 5A:
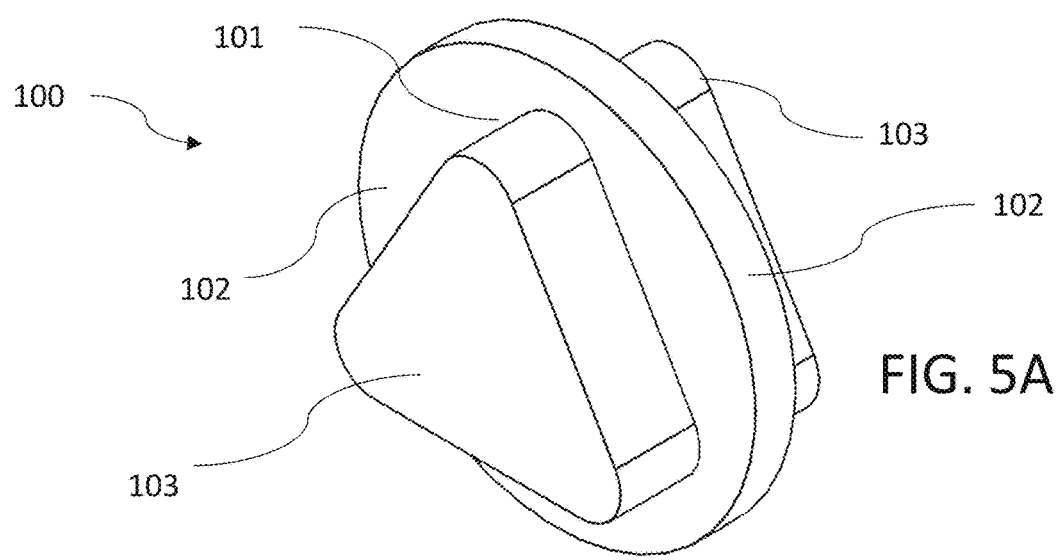
FIG. 5A illustrates a perspective view of a spacer-locator with one spacer tab and 2 triangular locator pins according to one embodiment of the present invention.

FIG. 5A is a perspective view of the spacer-locator embodiment in FIG. 3A, wherein the locator pins 103 are triangular in shape and the spacer-locator includes only one spacer tab 102. The triangle shape of the locator pins 103 advantageously prevents two substrates from rotating about the spacer-locator even if only 1 spacer-locator is used in bonding the two substrates. Notably, the spacer-locator illustrated in FIG. 5A prevents rotation between bonded surfaces by incorporating an anti-rotation feature into the locator pin.

Figure 5B:
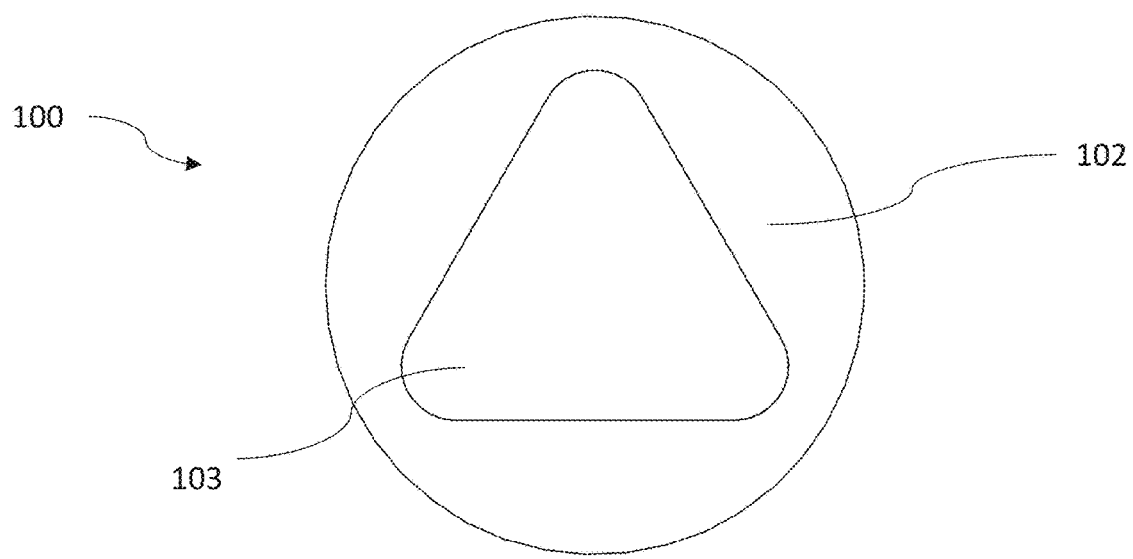
FIG. 5B illustrates a side view of the embodiment illustrated in FIG. 5A.

FIG. 5B is a top view of the spacer-locator embodiment in FIG. 5A.

Figure 5C:
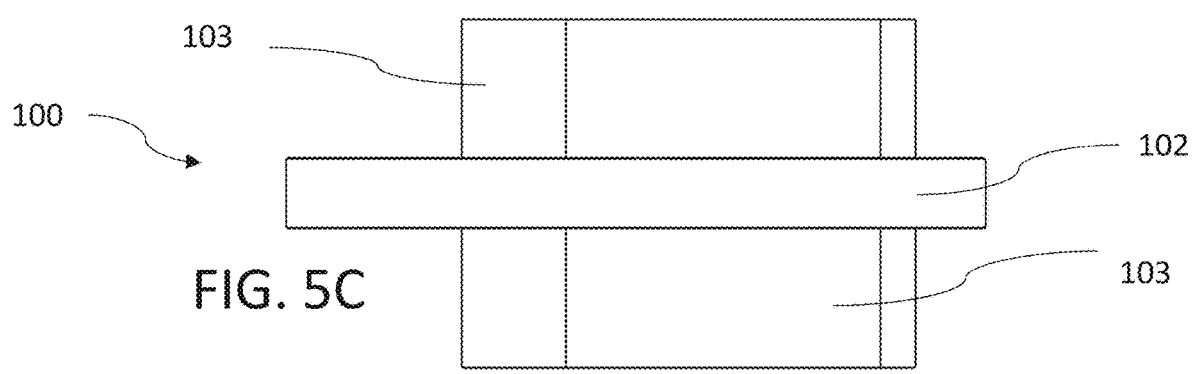
FIG. 5C illustrates a top view of the embodiment illustrated in FIGS. 5A and B.

FIG. 5C is a side view of the spacer-locator embodiment in FIG. 5A.

Figure 6A:
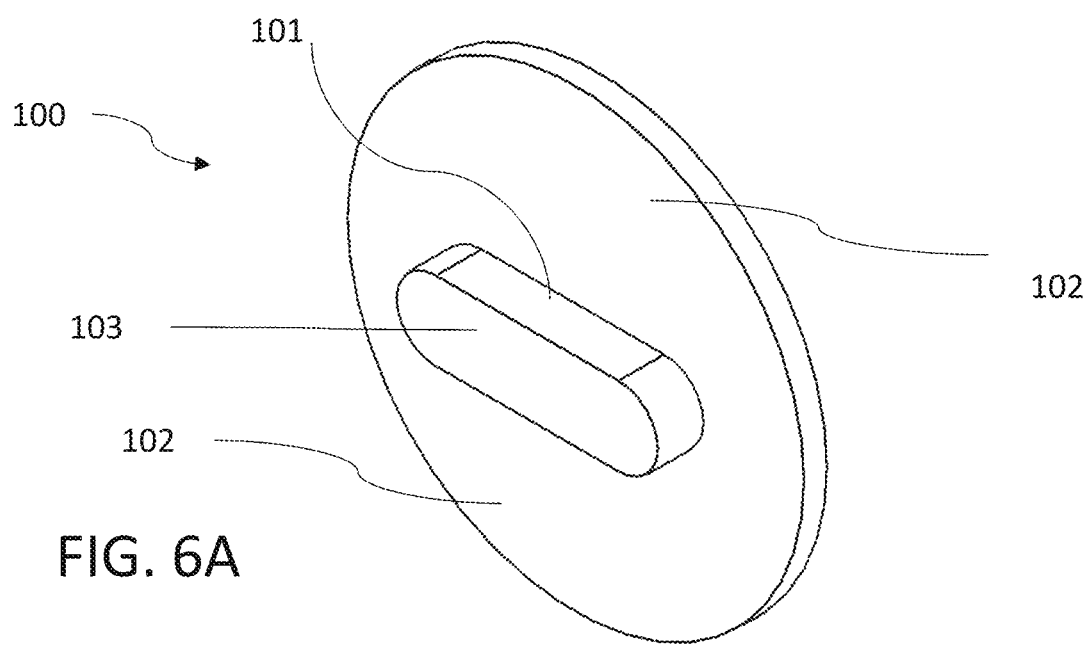
FIG. 6A illustrates a perspective view of a spacer-locator with one spacer tab and 2 slotted locator pins according to one embodiment of the present invention.

FIG. 6A is a perspective view of the spacer-locator embodiment in FIG. 3A, wherein the locator pins 103 are slotted in shape. The slotted locator pins are advantageously the simplest method to machine. The shape of the slotted spacer-locator also advantageously provides for anti-rotation feature.

Figure 6B:
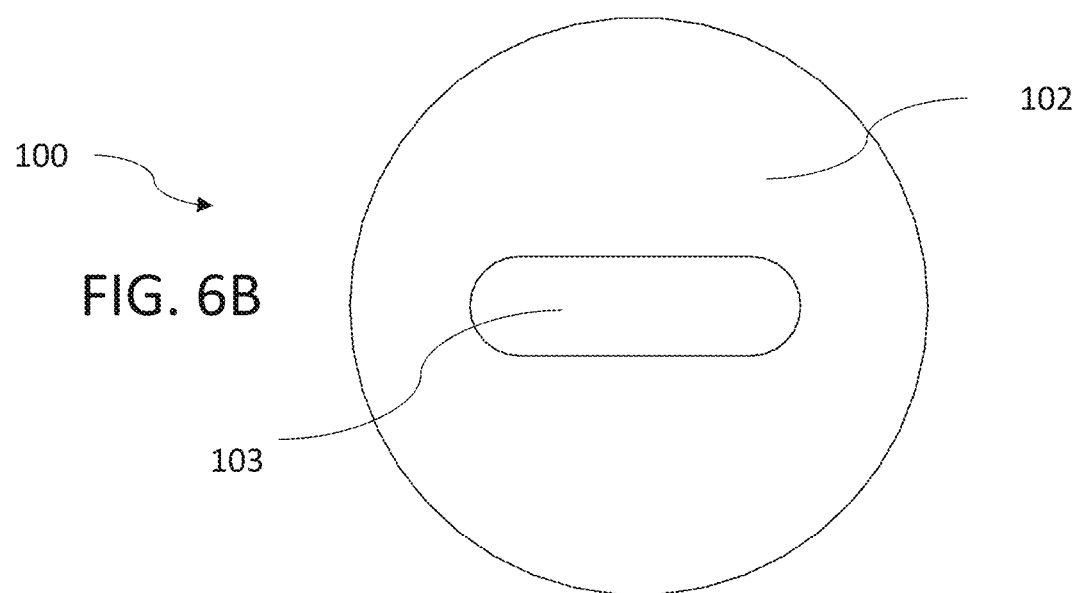
FIG. 6B illustrates a side view of the embodiment illustrated in FIG. 6A.

FIG. 6B is a top view of the spacer-locator embodiment in FIG. 6A.

Figure 6C:
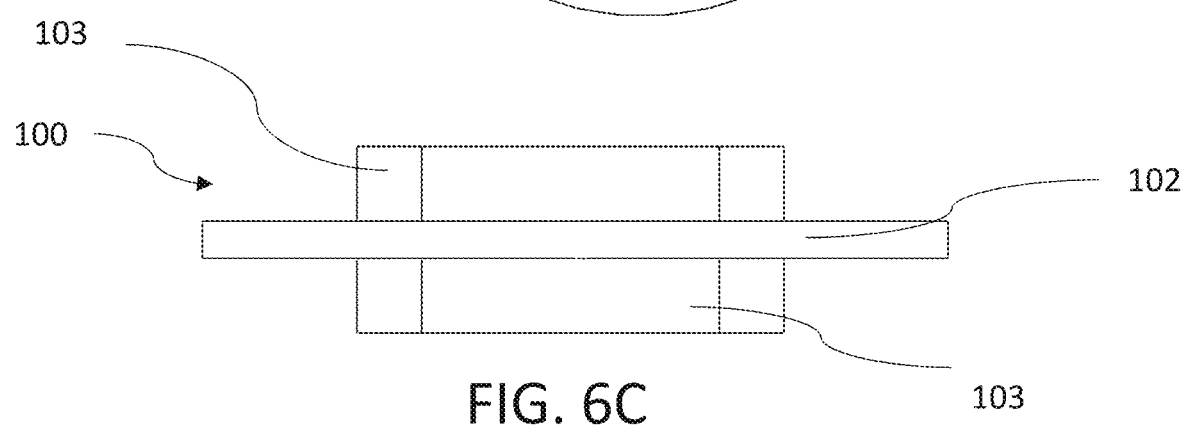
FIG. 6C illustrates a top view of the embodiment illustrated in FIGS. 6A and B.

FIG. 6C is a side view of the spacer-locator embodiment in FIG. 6A.

Figure 7A:
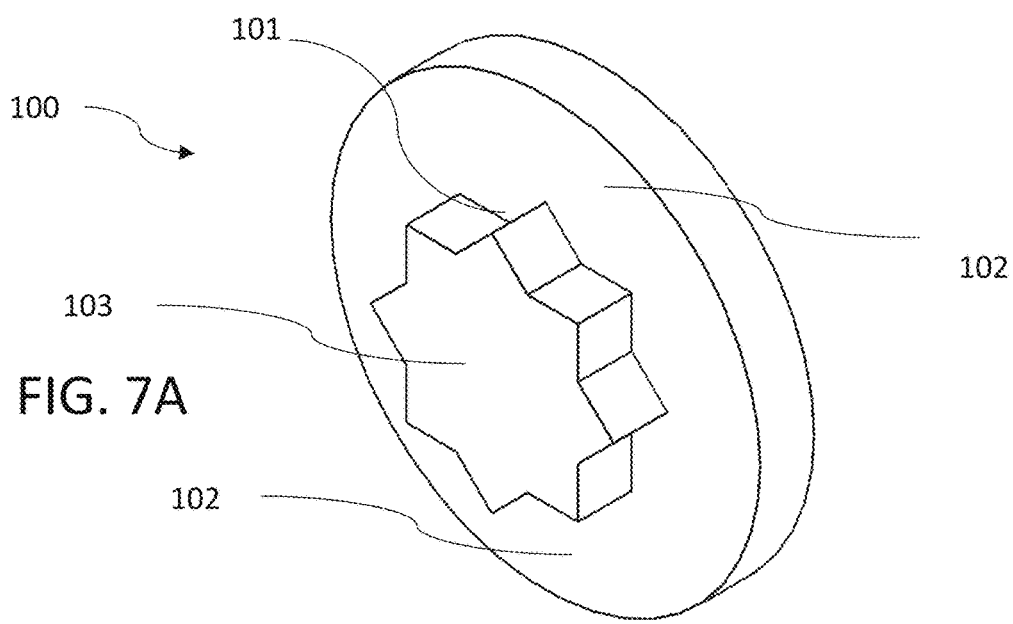
FIG. 7A illustrates a perspective view of a spacer-locator with one spacer tab and 2 double-square locator pins according to one embodiment of the present invention.

FIG. 7A is a perspective view of the spacer-locator embodiment in FIG. 3A, wherein the locator pins 103 are double-square in shape. The double-square spacer-locator provides increased resistance to rotational motions of the two substrates to which the double-square spacer-locator is bonded. The double-square also provides greater contact area between the locator pin and the substrates than an equally sized slotted spacer-locator, thereby reducing the risk of deforming the substrates and/or spacer.

Figure 7B:
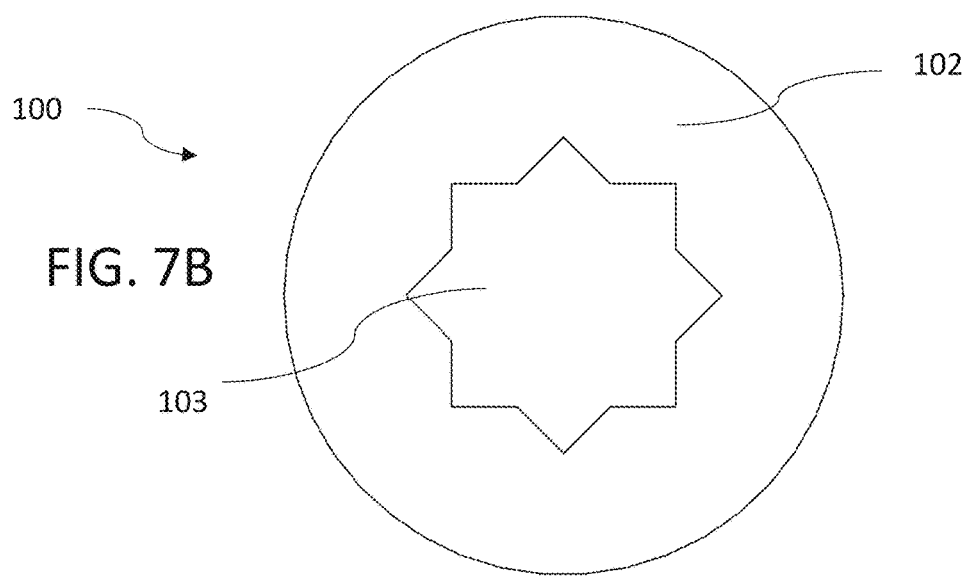
FIG. 7B illustrates a side view of the embodiment illustrated in FIG. 7A.

FIG. 7B is a top view of the spacer-locator embodiment in FIG. 7A.

Figure 7C:
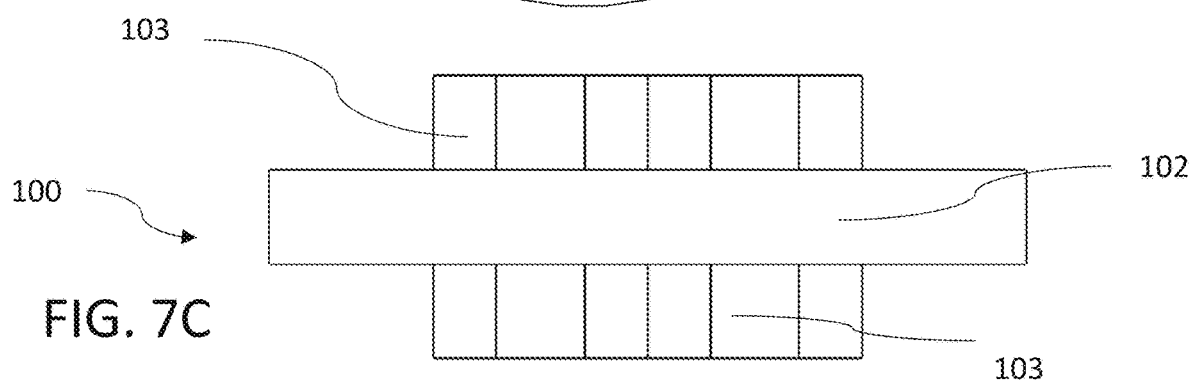
FIG. 7C illustrates a top view of the embodiment illustrated in FIGS. 7A and B.

FIG. 7C is a side view of the spacer-locator embodiment in FIG. 7A.

Figure 8:
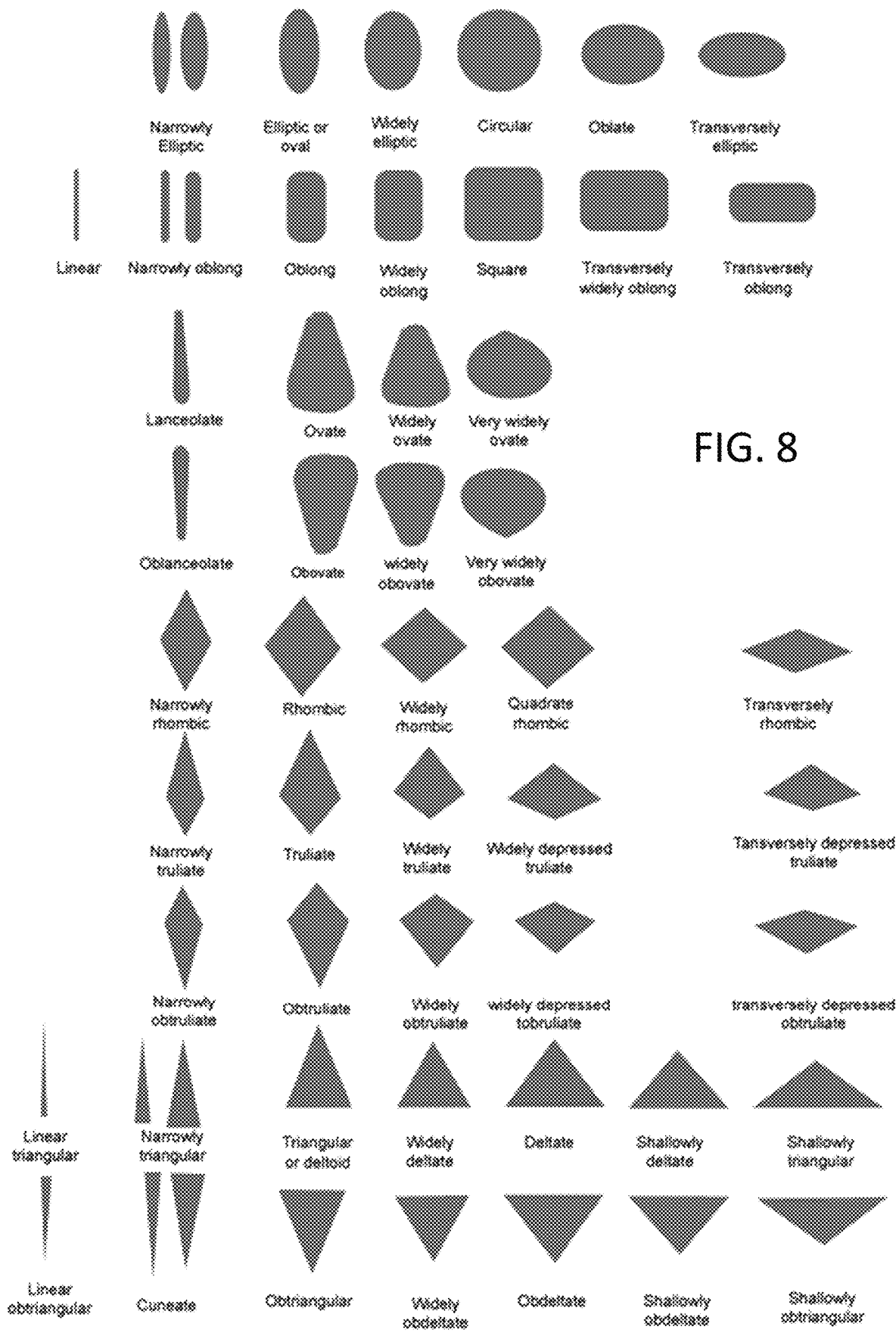
FIG. 8 illustrates some example spacer tab shapes and locator pin cross-section designs according to the present invention.

The spacer tabs are any shape that is able to maintain a specified spacing between two substrates. The tabs can be planar or non-planar. Example profile shapes for spacer tabs are shown in FIG. 8. This same figure also shows example cross-sectional shapes of the locator pins.

Figure 9A:
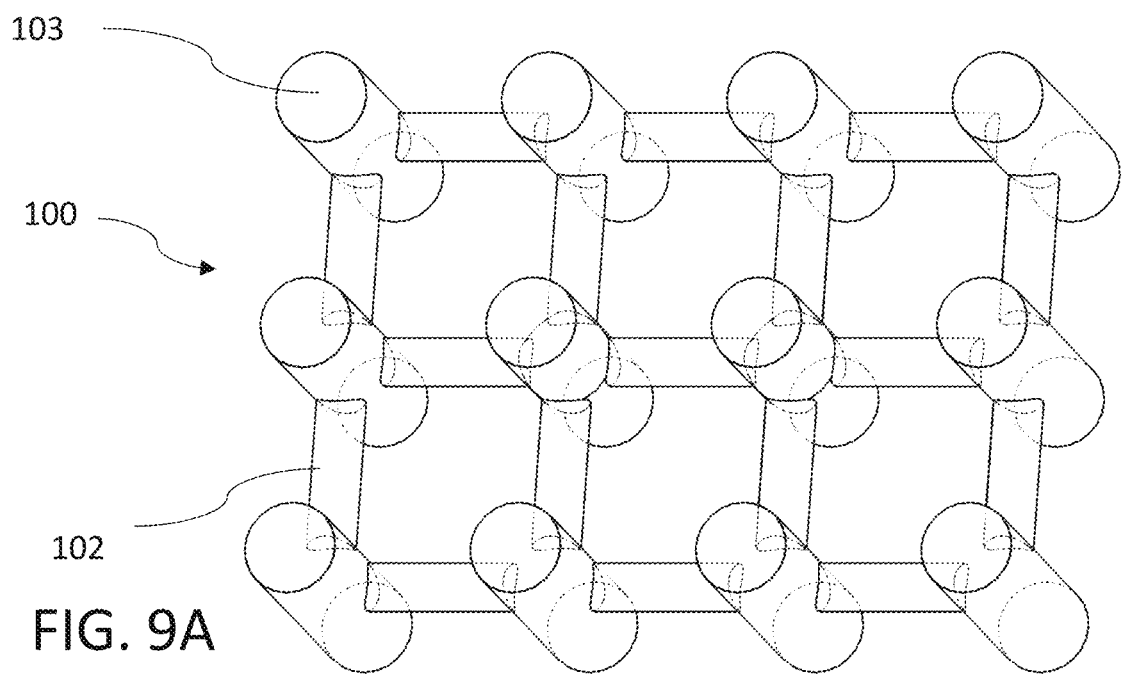
FIG. 9A illustrates a perspective view of a lattice spacer-locator designed with 12 locator pins and 17 spacer tabs according to one embodiment of the present invention.

Another embodiment of the present invention provides for a multiplicity of locator pins affixed to a multiplicity of spacer tabs. FIG. 9A is a perspective view of a lattice structure spacer-locator according to one embodiment of the present invention. The spacer-locator 100 is shaped in a lattice structure. The spacer-locator 100 includes 12 locator pins 103 and 17 spacer tabs 102. The spacer-locator 100, including the spacer tabs 102, and locator pins 103 are formed from one piece of material. Alternatively, the locator pins 103 attach to the spacer tabs 102 through threaded members. Alternatively, the locator pins 103 attach to the spacer tabs 102 with adhesive. Alternatively, the locator pins 103 attach to the spacer tabs 102 with thermal bonding. The lattice design of the spacer-locator intentionally sacrifices adhesive contact area in order to maximize shear strength. To maximize shear strength, the lattice structure spacer-locator is preferably made of a material with a higher shear strength than the joining agent utilized. However, in another embodiment, the lattice structure spacer-locator is made out of a material with an approximately equivalent shear strength to the joining agent utilized.

Figure 9B:
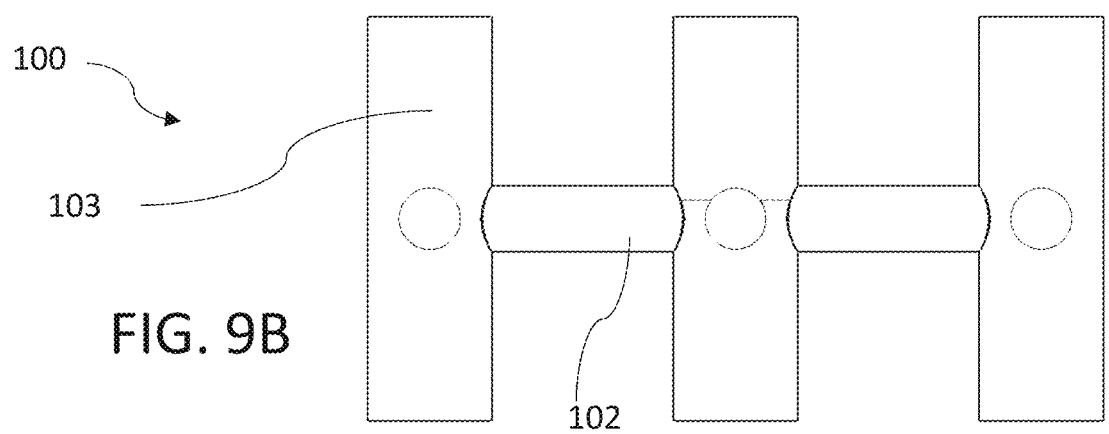
FIG. 9B illustrates a side view of the embodiment illustrated in FIG. 9A.

FIG. 9B is a side view of the spacer-locator embodiment illustrated in FIG. 9A.

Figure 9C:
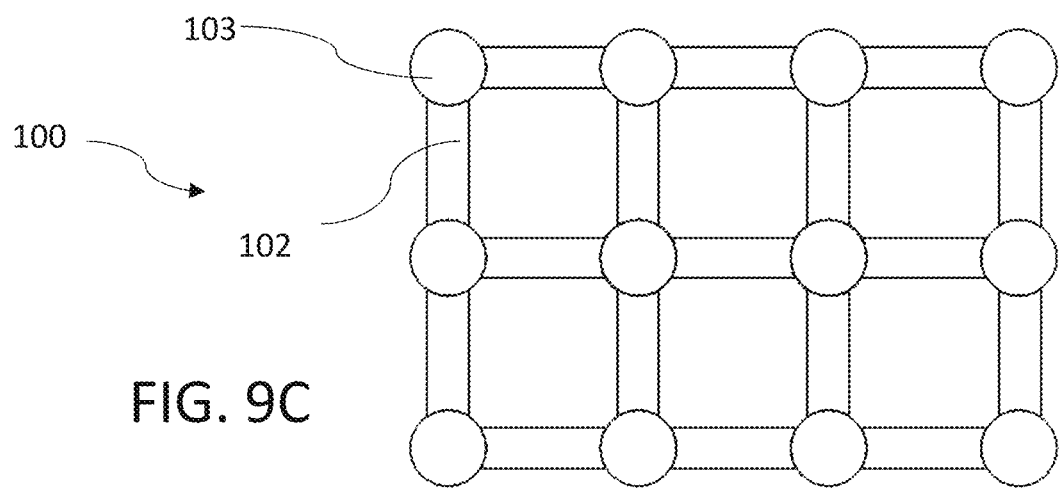
FIG. 9C illustrates a top view of the embodiment illustrated in FIGS. 9A and 9B.

FIG. 9C is a top view of the spacer-locator embodiment illustrated in FIG. 9A.

Figure 10A:
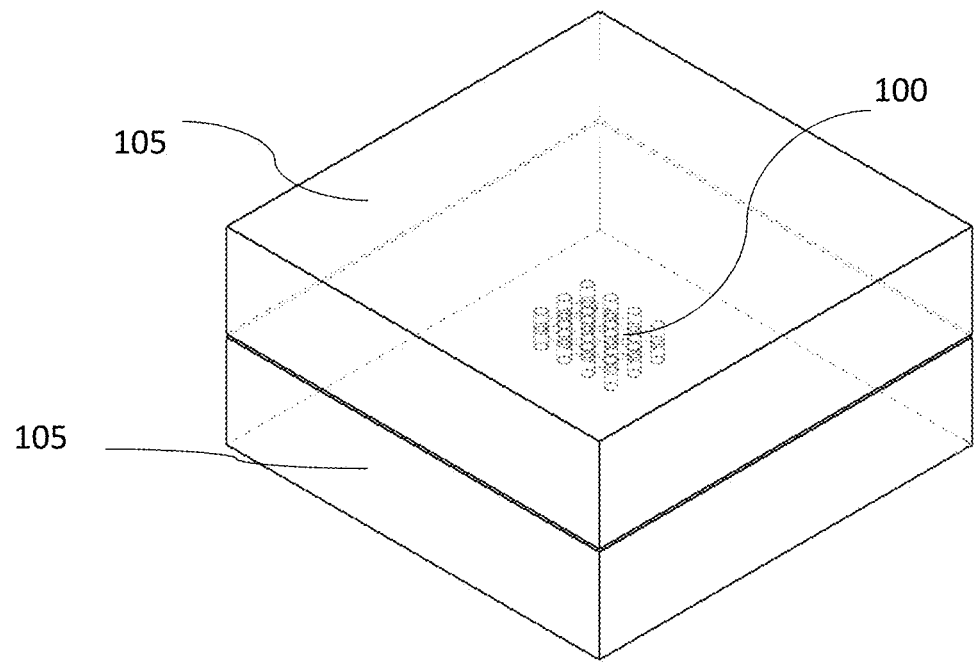
FIG. 10A illustrates a perspective view of the embodiments illustrated in FIGS. 9A, 8B, and 8C wherein the spacer-locator is included in a bonding assembly.

FIG. 10A is a perspective view of the spacer-locator embodiment illustrated in FIG. 9A, further illustrating the spacer-locator 100 in between bonded materials 105.

Figure 10B:
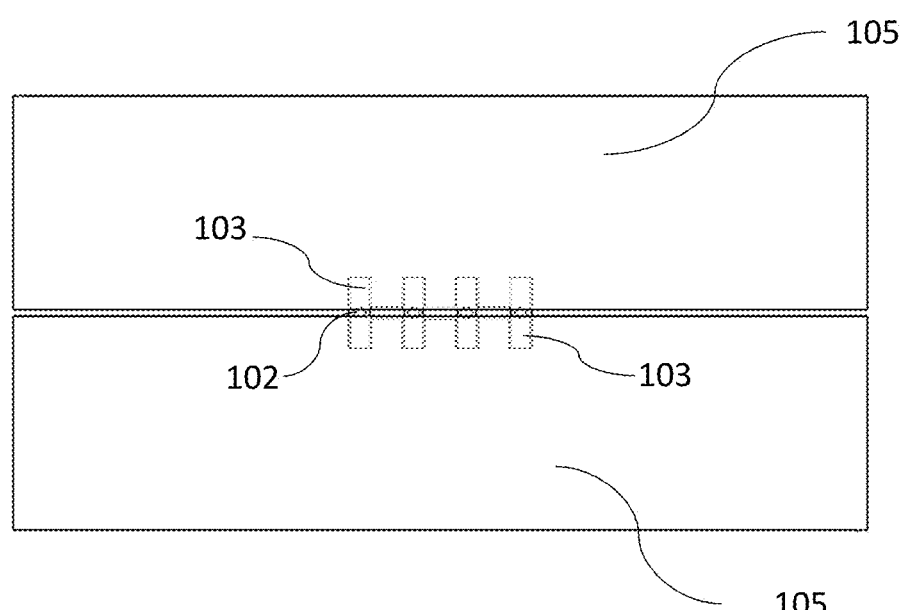
FIG. 10B illustrates a side view of the embodiments illustrated in FIGS. 9A, 8B, and 8C wherein the spacer-locator is included in a bonding assembly according to one embodiment of the present invention.

FIG. 10B is a side view of the spacer-locator embodiment illustrated in FIG. 10A, further identifying the individual locator pins 103.

Figure 11A:
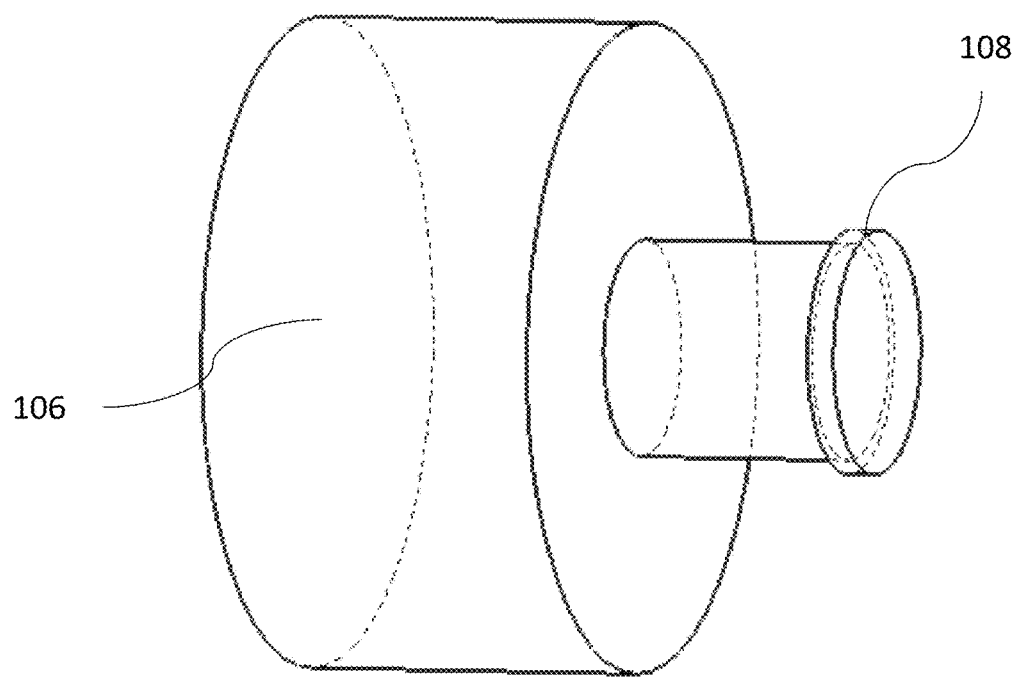
FIG. 11A illustrates a perspective view of a male locator pin according to one embodiment of the present invention.

FIG. 11A is a perspective view of a locator pin according to one embodiment of the present invention. The male locator pin 106 represents one half of the locator pin assembly, and includes threading 108 that mates with the female locator pin (illustrated as 107 in FIGS. 12A and B). Together, the male locator pin 106 and the female locator pin 107 attach to one or more spacer tabs, forming a spacer-locator.

Figure 11B:
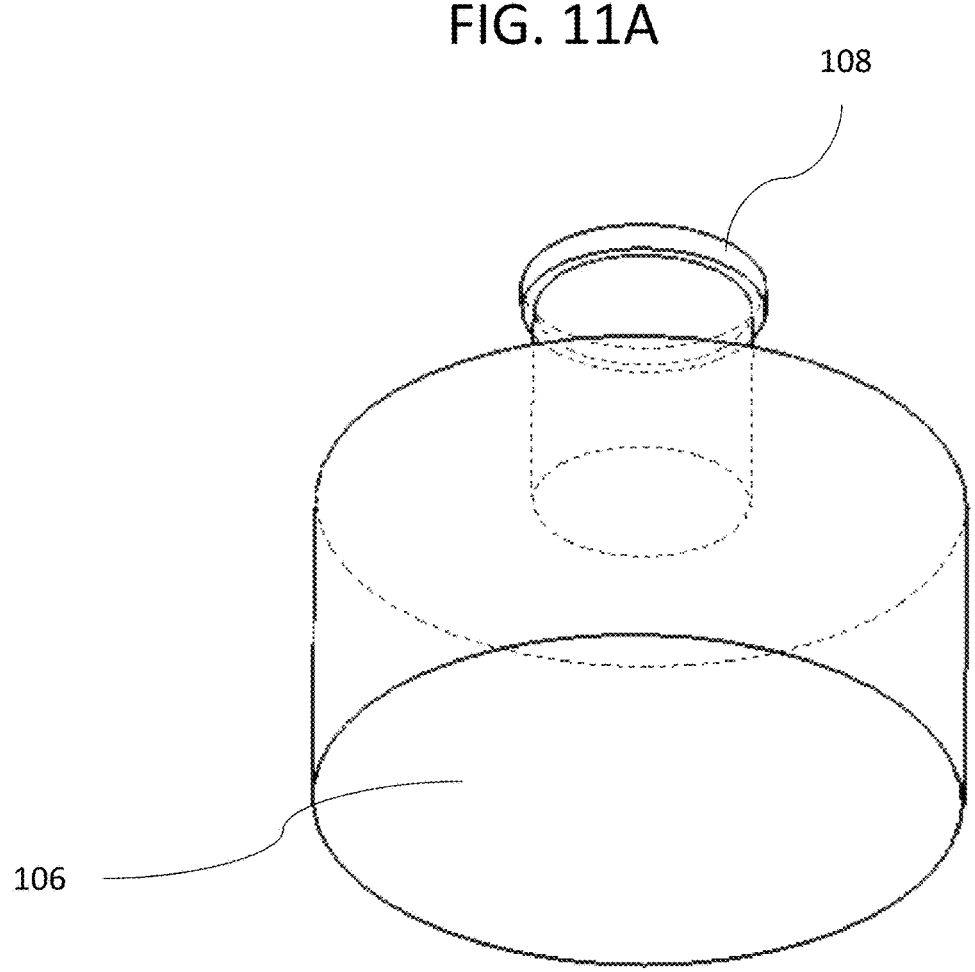
FIG. 11B illustrates another perspective view of the male locator pin illustrated in FIG. 11A.

FIG. 11B is a perspective view of the locator pin embodiment illustrated in FIG. 11A.

Figure 12A:
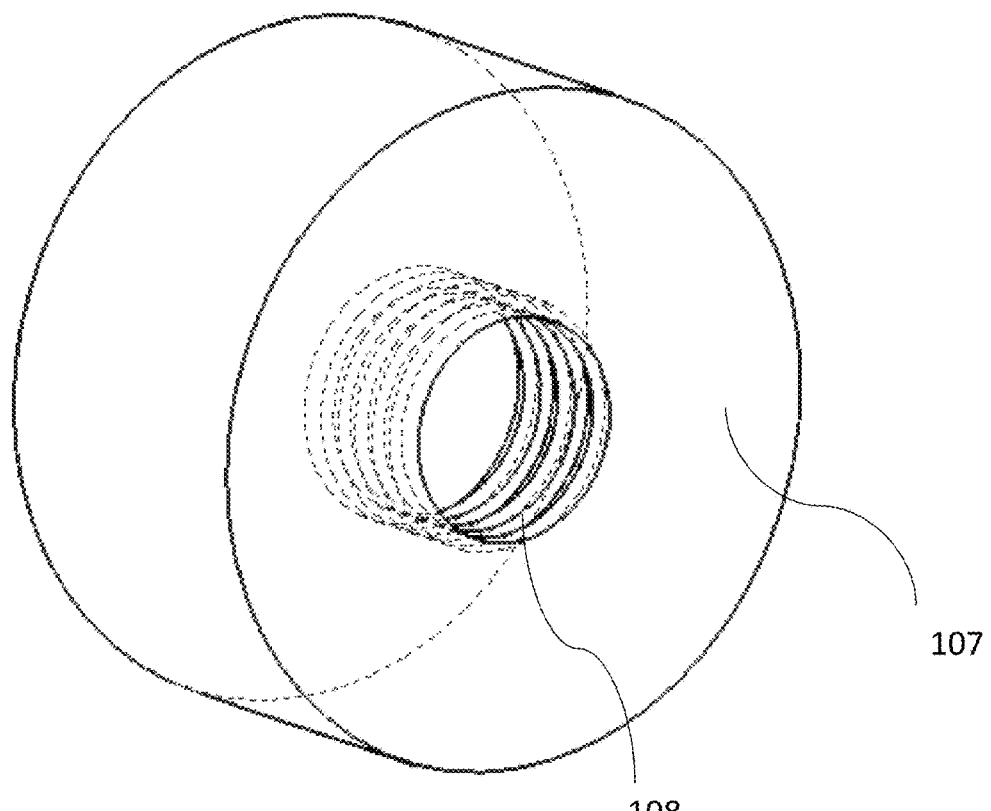
FIG. 12A illustrates a perspective view of a female locator pin according to one embodiment of the present invention.

FIG. 12A is a perspective view of a locator pin according to one embodiment of the present invention. The female locator pin 107 represents one half of the locator pin assembly, and includes threading 108 that mates with the male locator pin (illustrated in FIG. 11A and FIG. 14A).

Figure 12B:
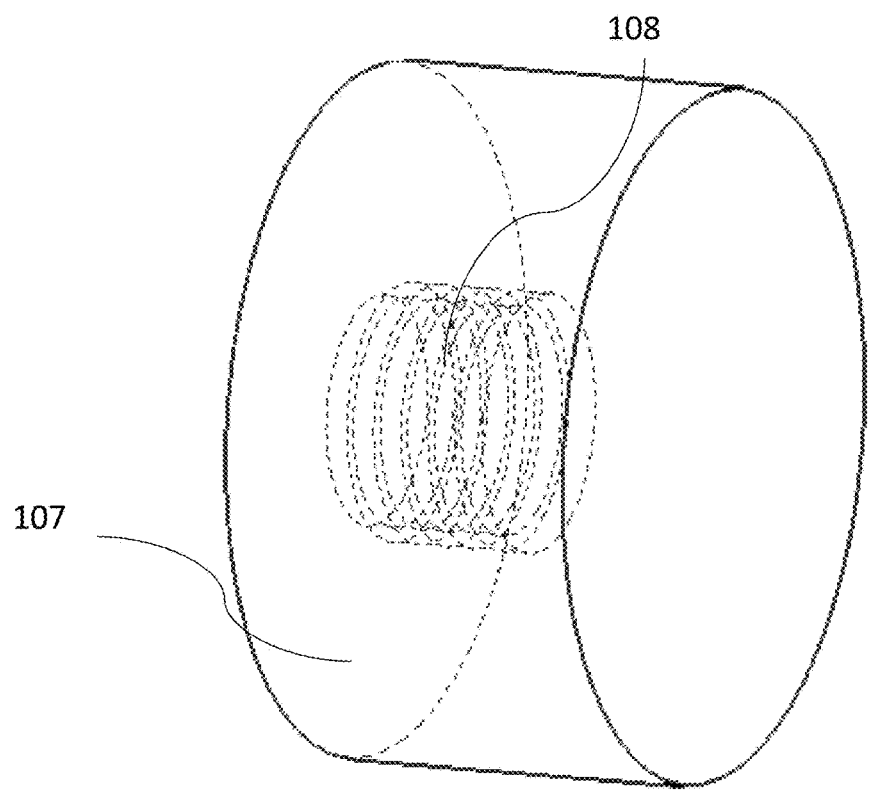
FIG. 12B illustrates another perspective view of a female locator pin illustrated in FIG. 12A.

FIG. 12B is a perspective view of the locator pin embodiment illustrated in 10A.

Figure 13A:
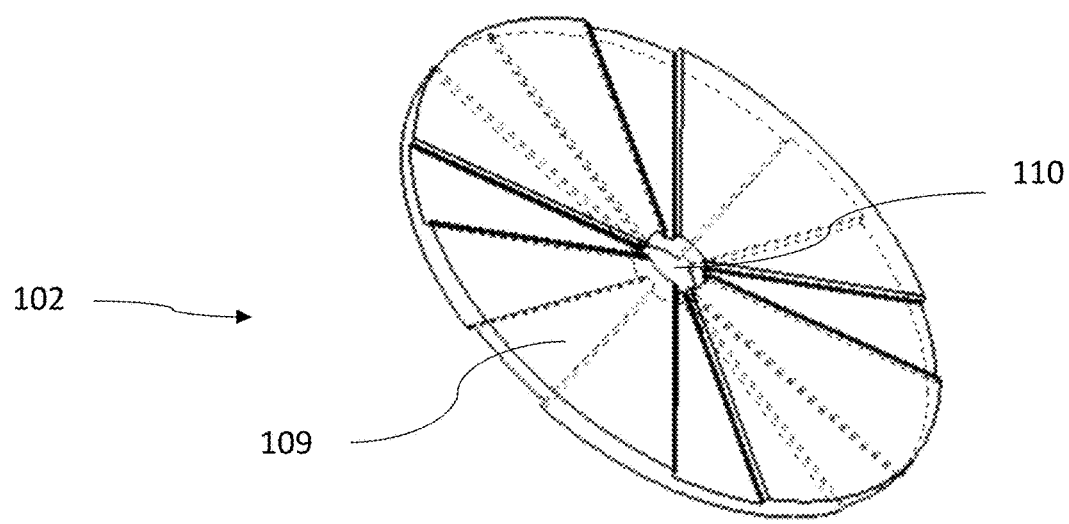
FIG. 13A illustrates a perspective view of a spacer tab with fluid channels according to one embodiment of the present invention.

FIG. 13A is a perspective view of a spacer tab according to one embodiment of the present invention. The spacer tab 102 incorporates fluid channels 109 and an opening 110 in the center of the spacer tab 102 for fitting locator pins. The spacer tab includes fluid channels in order to provide control over flow of fluids, such as adhesives, etching fluids, solvents, cleaners, primers, sealants, paints, gasses, dyes or other fluids used for the purpose of inspection, thermoset resins and/or thermoplastic resins. In circumstances where adhesive is injected, strategically positioned spacer-locators that direct fluid flow through the use of shaped spacer tabs allows a uniform and efficient adhesive application process.

Figure 13B:
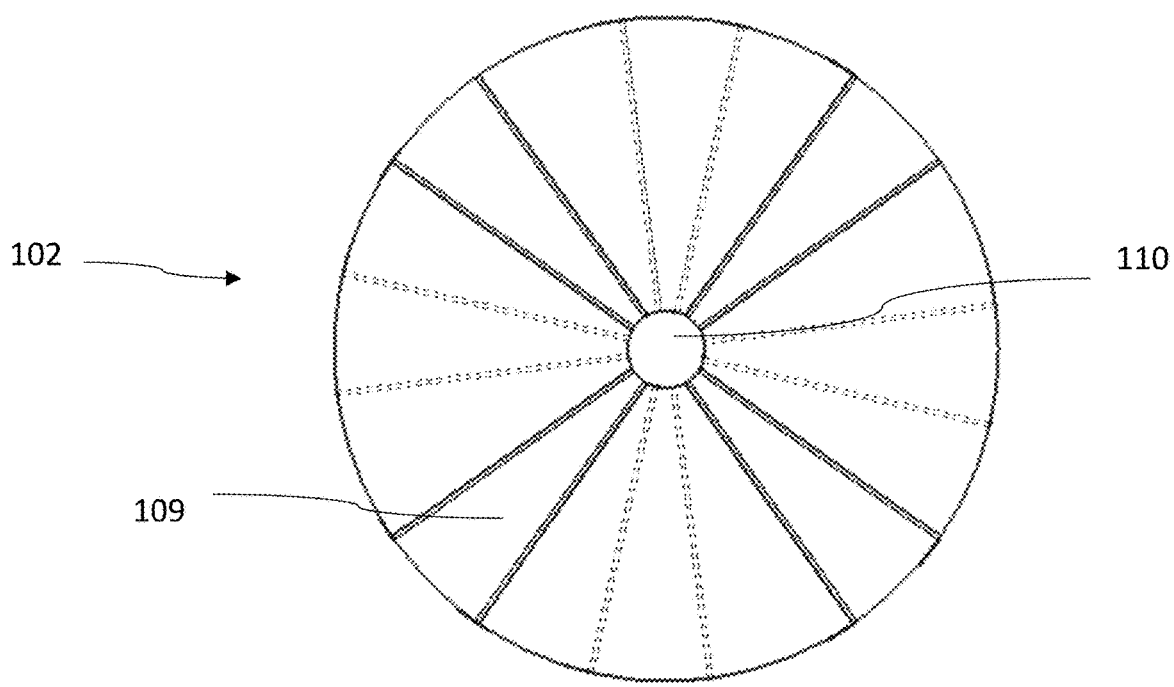
FIG. 13B illustrates a top view of the spacer tab embodiment illustrated in FIG. 13A.

FIG. 13B is a top view of the spacer tab embodiment illustrated in FIG. 13A.

Figure 13C:
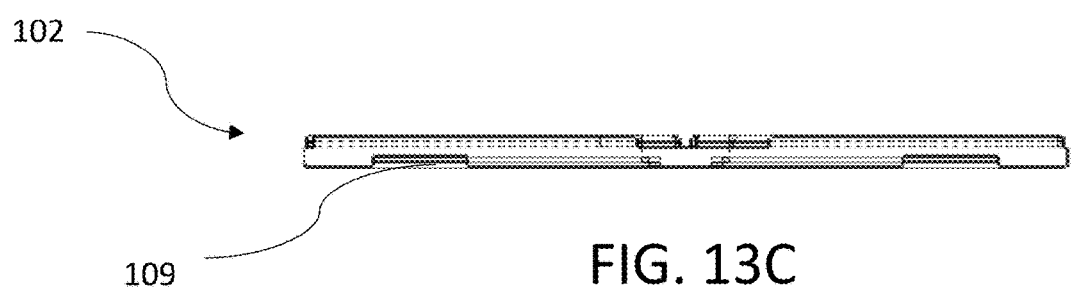
FIG. 13C illustrates a side view of the spacer tab embodiment illustrated in FIGS. 13A and B.

FIG. 13C is a side view of the spacer tab embodiment illustrated in FIG. 13A.

Figure 14A:
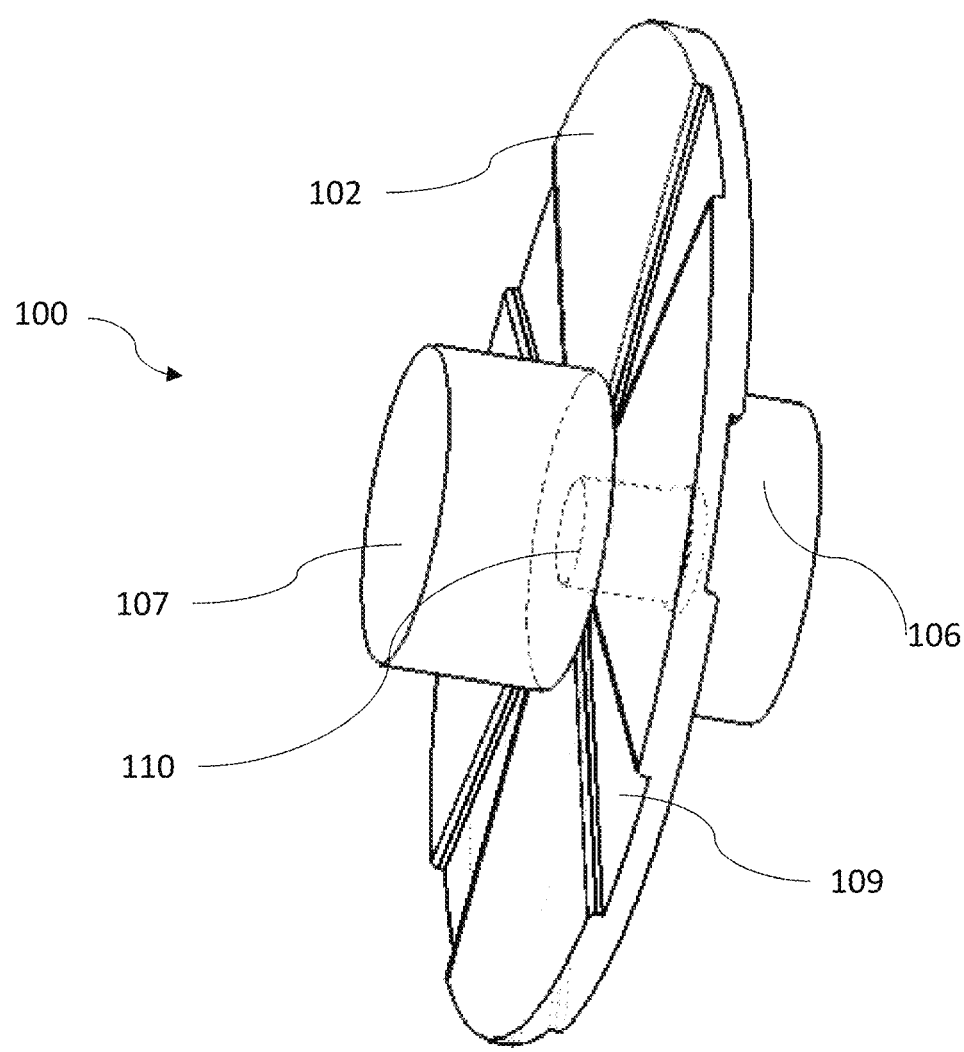
FIG. 14A illustrates a perspective view of a spacer-locator that incorporates the interchangeable locator pins illustrated in FIG. 11A, FIG. 11B, FIGS. 12A and B, and the spacer tabs illustrated in FIG. 13A-C.

FIG. 14A is a perspective view of a spacer-locator embodiment utilizing the male locator pin illustrated in FIGS. 11A and B, the female locator pin illustrated in FIGS. 11A and B, and the spacer tab illustrated in FIGS. 13A-C, according to one embodiment of the present invention. The spacer-locator 100 includes a spacer tab 102 with fluid channels 109, as well as a male locator pin 106 and a female locator pin 107. The male locator pin 106 extends through an opening 110 in the center of the spacer tab 102 and mates with the female locator pin 107. Advantageously, the male locator pin and female locator pin are operable to function with a variety of spacer tabs with different thicknesses. The fluid channels 109 of the spacer tab direct the flow of adhesive and other fluids outward from the center of the spacer tab.

Figure 14B:
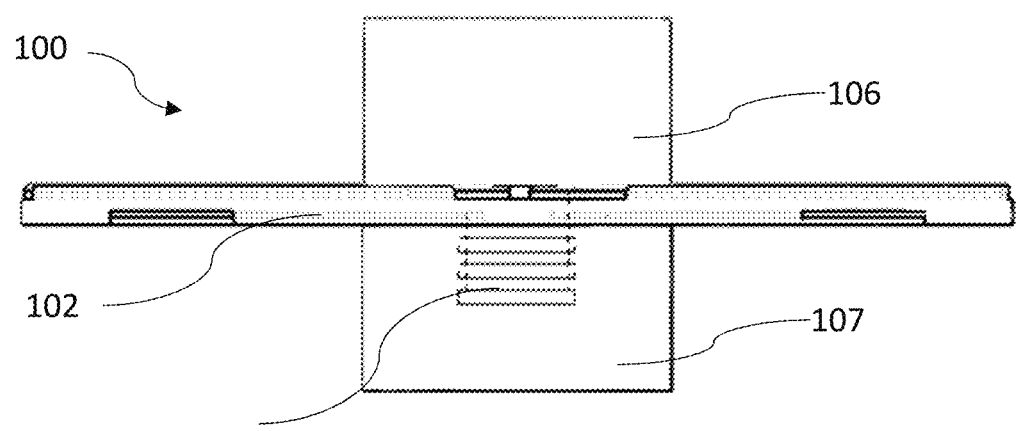
FIG. 14B illustrates a side view of the embodiment illustrated in FIG. 14A.

FIG. 14B is a side view of the spacer-locator embodiment illustrated in FIG. 14A, further illustrating the threading 108 that facilitates the mating of the male locator pin 106 and the female locator pin 107.

Figure 15A:
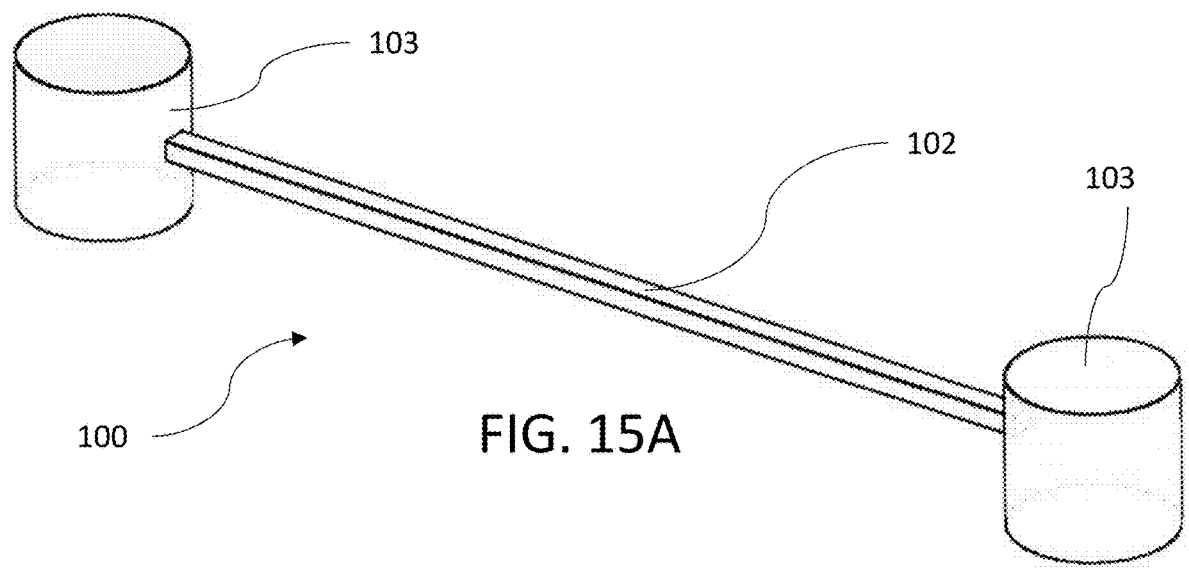
FIG. 15A illustrates a perspective view of a spacer-locator with two spacer bodies with locator pins connected by a single spacer tab according to one embodiment of the present invention.

In another embodiment of the present invention, the spacer-locator is shaped to allow the joining of more than two surfaces, wherein the multiple surfaces are all on the same bonding plane. This embodiment can bond more than two surfaces together while providing inherent anti-rotation benefits. FIG. 15A is a perspective view of a spacer-locator according to one embodiment of the present invention. The spacer-locator 100 includes 2 locator pins 103 and a spacer tab 102. The spacer tab 102, and locator pins 103 are formed from one piece of material. Alternatively, the locator pins 103 attach to the spacer tab 102 through threaded members. Alternatively, the locator pins 103 attach to the spacer tab 102 with adhesive.

Figure 15B:
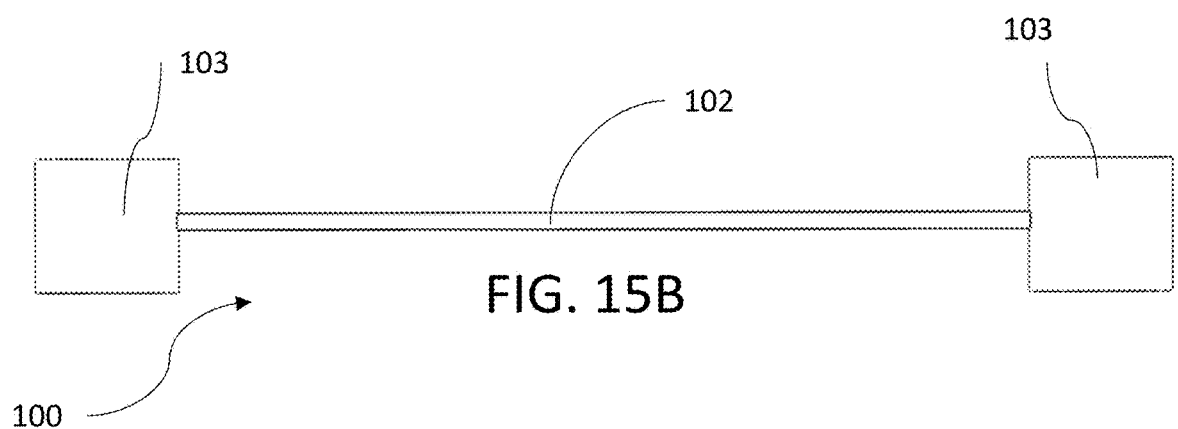
FIG. 15B illustrates a side view of the embodiment illustrated in FIG. 15A.

FIG. 15B is a side view of the spacer-locator embodiment illustrated in FIG. 15A.

Figure 15C:
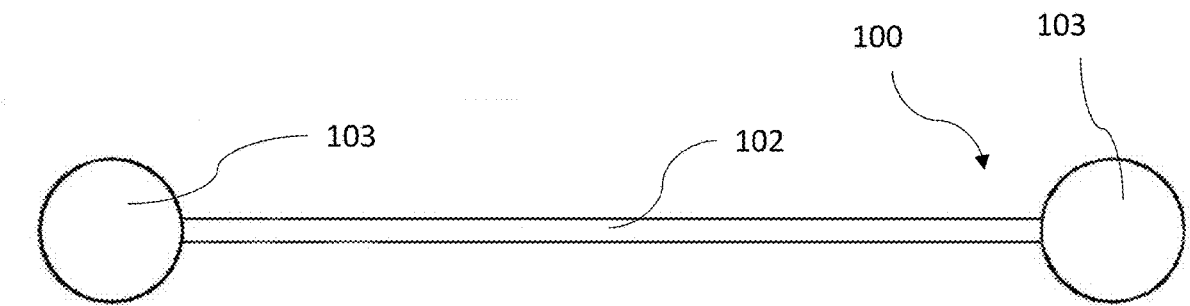
FIG. 15C illustrates a top view of the embodiment illustrated in FIGS. 15A and B.

FIG. 15C is a top view of the spacer-locator embodiment illustrated in FIG. 15A.

In another embodiment of the present invention, the spacer-locator is shaped to allow the joining of more than two surfaces, wherein the multiple surfaces are not all on the same plane.

Figure 16A:
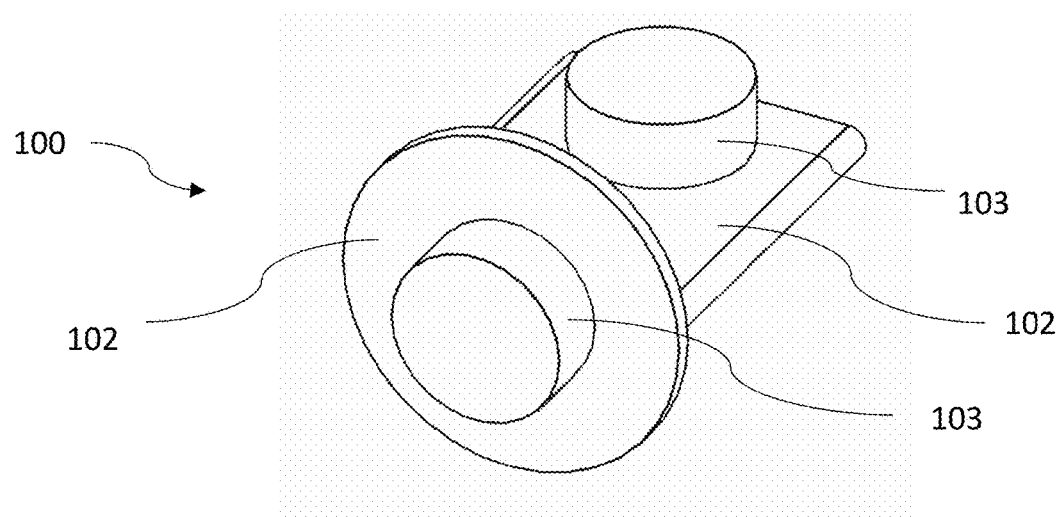
FIG. 16A illustrates a perspective view of a spacer-locator that aligns 3 surfaces according to one embodiment of the present invention.

FIG. 16A is a perspective view of another spacer-locator according to one embodiment of the present invention. The spacer-locator 100 includes spacer tabs 102 and locator pins 103. The spacer-locator 100, including the spacer tabs 102, and locator pins 103 are formed from one piece of material. Alternatively, the locator pins 103 attach to the spacer tabs 102 through threaded members. Alternatively, the locator pins 103 attach to the spacer tabs 102 with adhesive. Alternatively, the locator pins 103 attach to the spacer tabs 102 with thermal bonding. Advantageously, the spacer-locator illustrated in FIG. 16A is shaped to provide an additional spacer plane to allow the bonding of at least 3 surfaces.

Figure 16B:
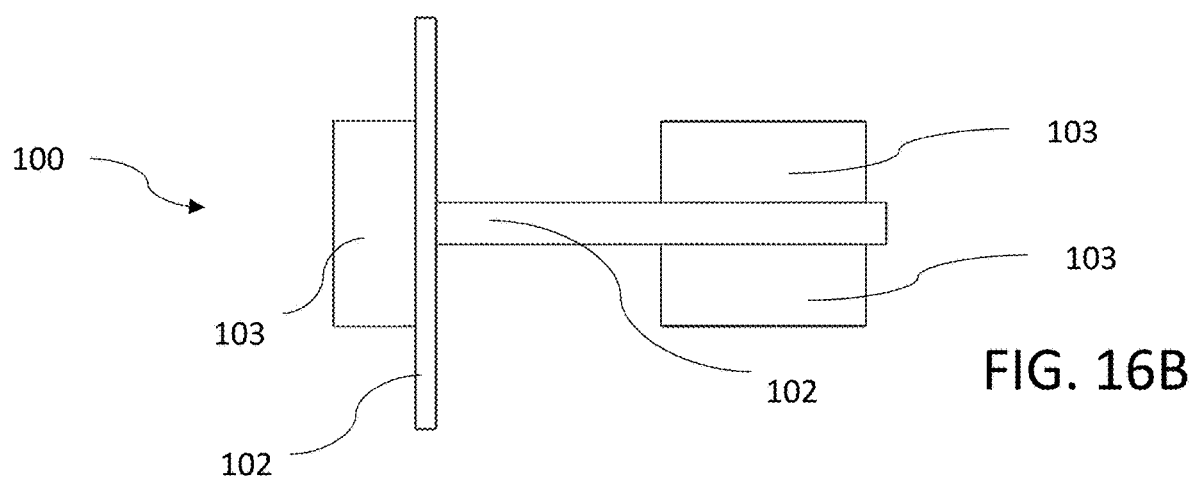
FIG. 16B illustrates a side view of the embodiment illustrated in FIG. 16A.

FIG. 16B is a side view of the spacer-locator embodiment illustrated in FIG. 16A.

Figure 16C:
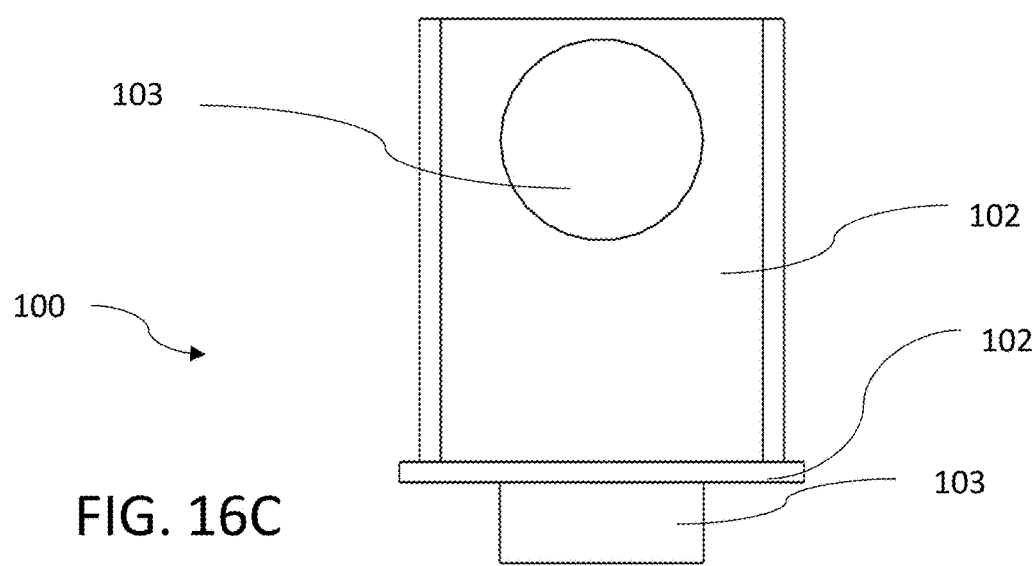
FIG. 16C illustrates a top view of the embodiment illustrated in FIGS. 16A and B.

FIG. 16C is a top view of the spacer-locator embodiment illustrated in FIG. 16A.

Figure 18A:
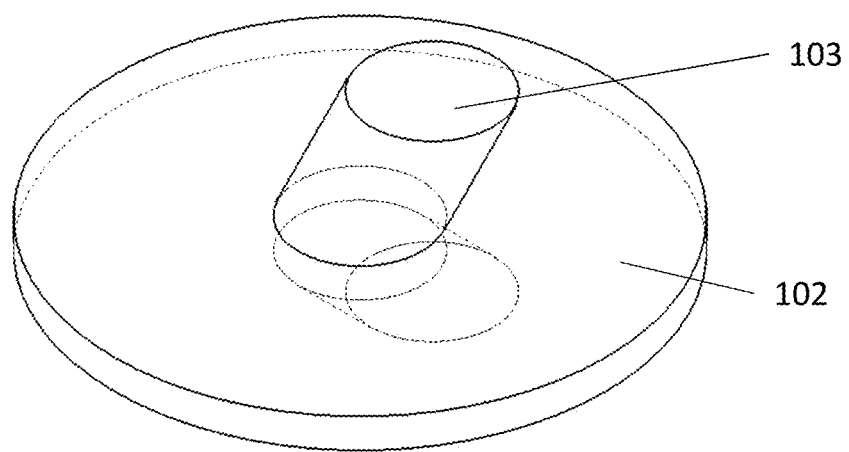
FIG. 18A illustrates a perspective view of a spacer-locator that has locator pins that are not perpendicular to the mating surfaces.
Figure 18B:
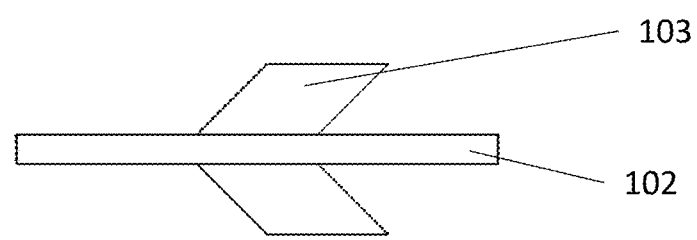
FIG. 18B illustrates a side view of the embodiment illustrated in FIG. 18A.

In an alternative embodiment, the spacer-locator allows the joining of at least 4 surfaces (FIGS. 17A-C). In another alternative embodiment, the locator pins are not perpendicular to the mating surface (FIGS. 18A-B). This allows for joining objects that cannot be inserted into the space orthogonally to the mating surfaces, or are angled with respect to the mating surfaces and not of sufficient size to accommodate a perpendicular locator pin. These embodiments provide additional functionality in ensuring substantially uniform adhesive thickness between numerous components that are joined together simultaneously.

In an alternative embodiment of the present invention, rotation is prevented between mating surfaces by incorporating an anti-rotation feature into the spacer tabs. FIGS. 19A-C illustrates a spacer-locator for joining 8 surfaces wherein the anti-rotation feature is provided by the spacer tabs. The vertical tabs 111, in addition to maintaining the space between the surfaces, also prevent rotation of the surfaces because the orthogonal shape formed by two adjacent spacer-tabs prevents the rotation of the orthogonal objects being bonded.

The present invention also provides for spacer-locators designed and configured to join non-planar surfaces together. An example spacer-locator with non-planar spacer tab 112 is shown in FIGS. 20A-C. Here, a partial-sphere surface spacer-locator is illustrated which is used to join together a concave and a convex surface. Another example includes a partial-cylinder surface spacer-locator (not shown).

Figure 22A:
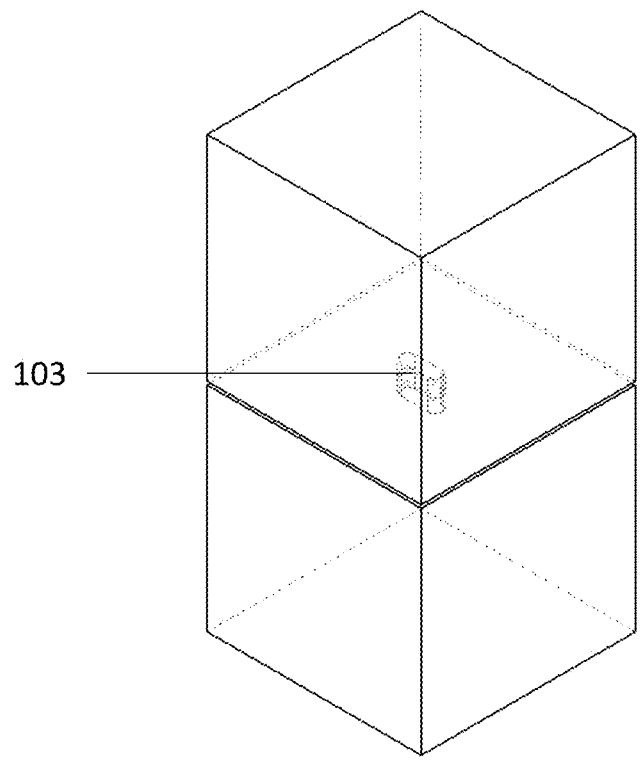
FIG. 22A illustrates a transparent perspective view of two objects held in position by a spacer-locator with a slot locator and no spacer tabs according to the present invention.
Figure 22B:
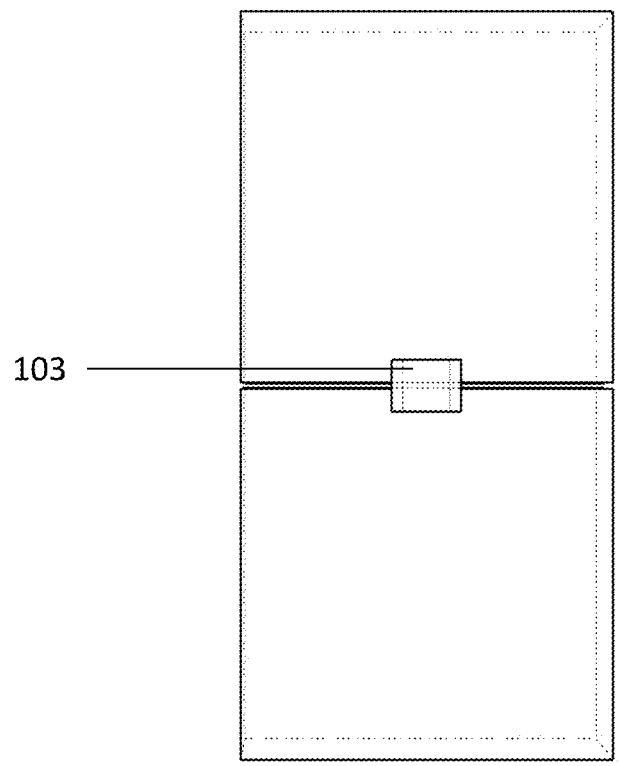
FIG. 22B illustrates a transparent side view of the embodiment illustrated in FIG. 22A.

In another embodiment, the spacer-locator contains no spacer tabs. The desired separation is maintained by using at least one spacer locator pin with a length that is greater than the combined depth of the positioning holes. The spacer locator pin is thus sized to provide the desired separation between the mating surfaces and the desired mechanical strength against shear stress. In some examples of this embodiment, the spacer locator pin is shaped as a prolate spheroid, cylinder (FIGS. 21A&B) or slot (FIGS. 22A&B) The slot shape has a cross-section that is an elongated rectangular with rounded corners; this cross-section shape is also called stadium, discorectangle, or obround.

Another embodiment provides for a spacer-locator integrated into one of the objects to be joined (FIGS. 23A-C). FIG. 23A illustrates a perspective view of two spacer-locators integrated into an object. FIGS. 23B and C are a side view and a top view of the embodiment, respectively. The mating object contains the corresponding locator hole(s). Thus, the present invention provides a system for joining two objects together, wherein the spacer-locator is integral with one of the objects and the other object contains a corresponding locator hole.

As shown in FIGS. 23A-C, the spacer tab and the locator pin are located on the same object. Alternatively, they are located on opposing objects, as shown in FIGS. 24A-C.

The spacer-locator and/or locator pin are preferably manufactured with a material that has the same or similar intrinsic material properties as the mating surfaces. For example, the spacer-locator material has the same or similar electrical conductivity, thermal expansion, corrosion resistance, and/or aesthetic qualities as the mating surfaces.

The various components of the spacer-locator are attached to one another using any acceptable means or combinations of means. For example, the components are attached to one another by mechanical fastening, by way of example and not limitation, through the utilization of threaded members. In another example, the components are attached using adhesives, that include, but are not limited to, laminates, hot adhesives, reactive adhesives, polyester-polyurethane resin, polyols-polyurethane resin, acrylic polymers-polyurethane resin, epoxy, methacrylate, and/or cyanoacrylate. In yet another example, the components are attached by thermal bonding, including but not limited to, plastic welding, electric welding, tungsten arc welding and/or soldering. In another example, the components are attached through the use of magnets within the locator pins and the spacer body.

Figure 25A:
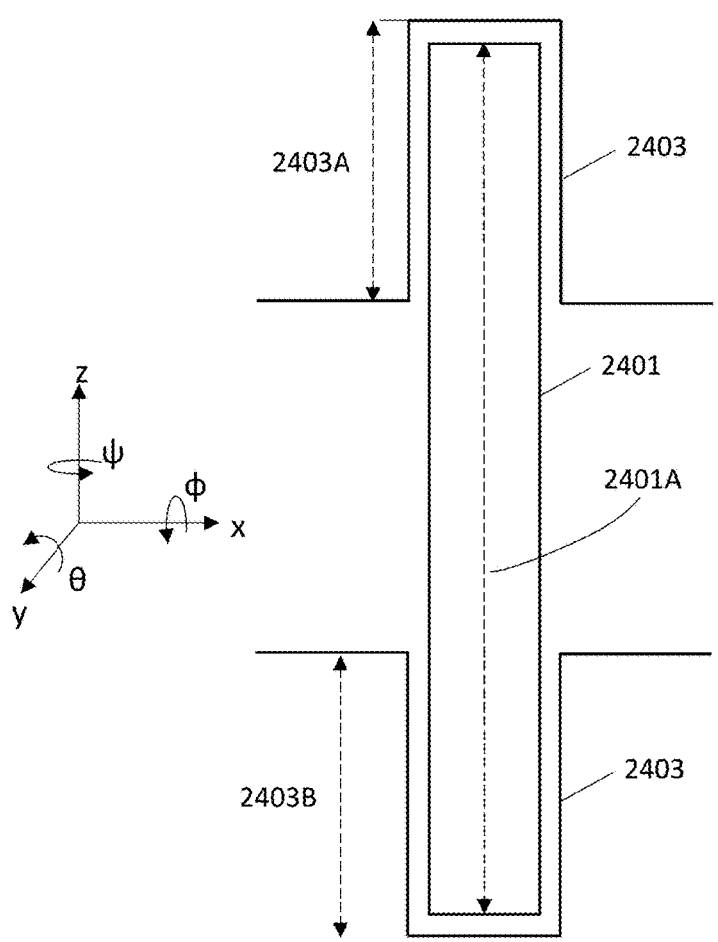
FIG. 25A illustrates a side view of a cylindrical spacer-locator pin according to one embodiment of the present invention.
Figure 25B:
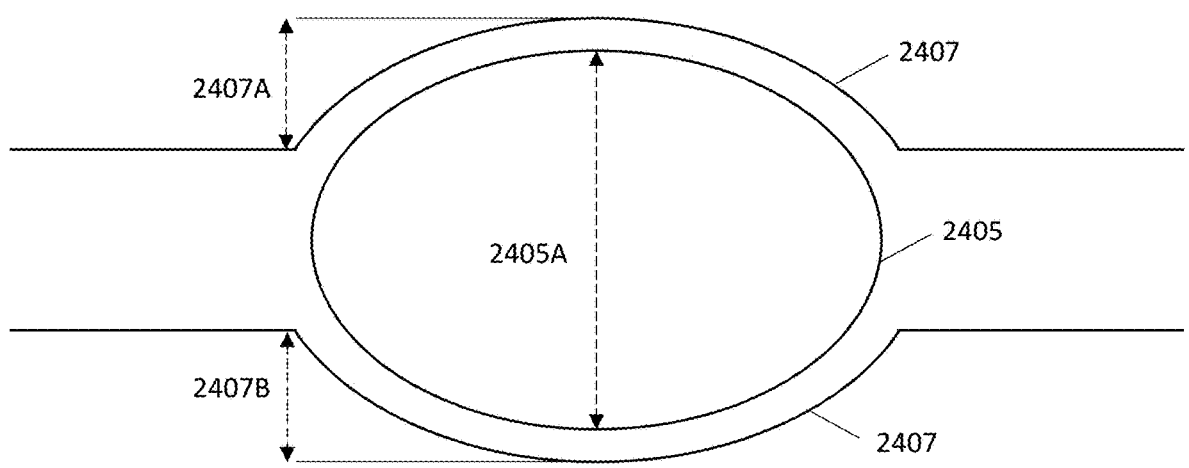
FIG. 25B illustrates a side view of an ellipsoid spacer-locator pin according to one embodiment of the present invention.

FIGS. 25A and 25B illustrate one embodiment of the present invention, wherein the spacer-locator includes only a spacer-locator pin, wherein the spacer-locator pin is constructed without a separate spacer. In the illustrated embodiment, a spacer-locator pin 2401 both separates two surfaces and positions the surfaces without the need for separate spacer elements. The spacer-locator pin 2401 sits within spacer-locator slots 2403, wherein a depth of the spacer locator slot 2403A is less than half of the length of the spacer-locator pin 2401A when the spacer-locator slots are of equal depth. In another embodiment, the spacer-locator slots have differing depths, wherein a depth of the first spacer-locator slot 2403A is different than a depth of the second spacer-locator slot 2403B, and wherein a sum of the first depth 2403A and the second depth 2403B is less than the length of the spacer-locator pin 2401A in order to provide space between the surfaces. These constructions each provide space between the two surfaces while simultaneously providing positioning. The spacer-locator pin 2401 and the spacer-locator slots 2403 restricts movement in at least two dimensions (e.g., x-axis and y-axis) and restricts rotation in at least one or two dimensions (e.g., θ and φ). The spacer-locator pin 2401 is operable to be constructed with any shape, size, or dimensions as disclosed in reference to previous spacers and locator pins, including polygonal constructions and shapes that prevent rotation in a third dimension (e.g., ψ). In one embodiment, the spacer-locator pin 2401 is combined with at least one additional spacer locator pin, wherein the at least one additional spacer-locator pin is either connected to the spacer-locator pin 2401 or operates separately, and wherein the combination prevents rotation in at least one additional dimension (e.g., ψ). Notably, the spacer-locator pin is operable to be constructed from any shape, size, or dimension that both restricts movement and rotation and provides space between the surfaces. FIG. 25B illustrates one alternative embodiment, wherein an ellipsoid spacer locator-pin 4205 prevents movement in two directions (i.e., x-axis and y-axis). Similar to the spacer-locator in FIG. 25A, a corresponding dome-shaped spacer-locator slot 2407 has a depth 2407A equal to less than half of the height of the spacer-locator pin 2405A when slots on both surfaces have an equal depth (2407A, 2407B). In another embodiment, the depth of the first spacer-locator slot 2407A and the depth of the second spacer-locator slot 2407B are different, and a sum of the depth of the first spacer locator depth 2407A and the second spacer locator depth 2407B is less than a height of the spacer 2405A. In a further embodiment, the ellipsoid spacer-locator pin is combined with at least one additional ellipsoid spacer-locator pin (and/or any other shaped spacer-locator pin) to prevent rotation in at least one direction (e.g., φ or θ). While the illustrated tolerances between the spacer-locator pins and spacer-locator slots are exaggerated for clarity, lower tolerances are preferably constructed for a tighter fit (e.g., a close running fit or a sliding fit) for attachment of the spacer-locator pin to the spacer-locator slot. In one embodiment, the spacer-locator pin is adhered, attached, or secured in place via physical, mechanical, or chemical means, including by adhesive, welding, magnetism, pins, screws, bolts, nuts, or any other method known in the art of mechanical design or disclosed herein.

Figure 26A:
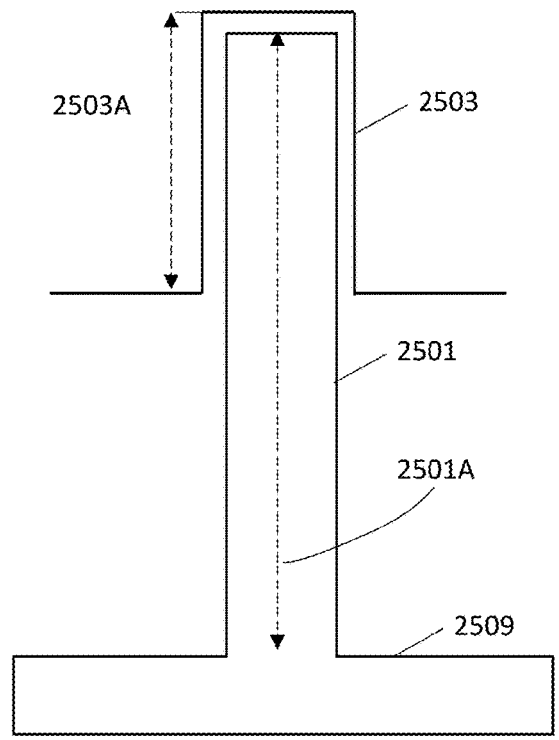
FIG. 26A illustrates a side view of a cylindrical spacer-locator pin integrally attached to a surface according to one embodiment of the present invention.
Figure 26B:
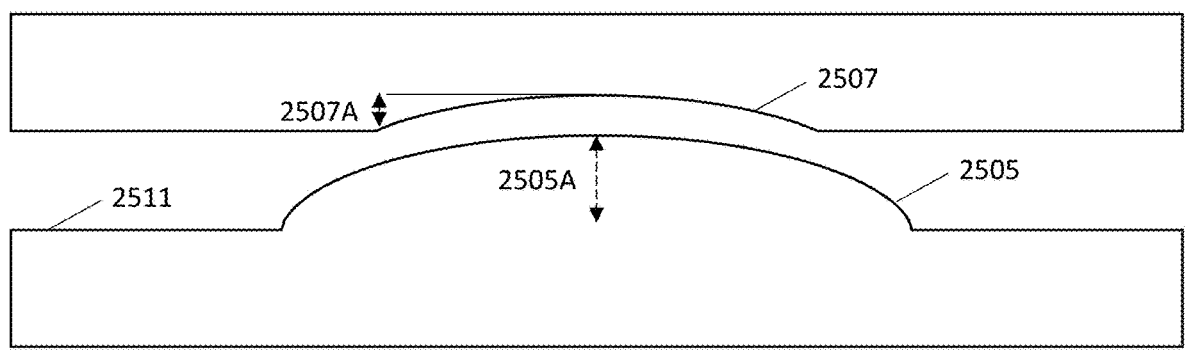
FIG. 26B illustrates a side view of a semiellipsoid spacer-locator pin integrally attached to a surface according to one embodiment of the present invention.

FIGS. 26A and 26B illustrate another embodiment of the spacer-locator pin, wherein the spacer-locator pin is integrally constructed from, attached to, or secured to one surface. In the illustrated embodiment of FIG. 25A, the cylindrical spacer locator pin 2501 is integral with a first surface 2509 and sits within the spacer-locator slot 2503 of a second surface. The extruded portion of the second surface that makes up the spacer-locator pin 2501 has a height 2501A that is greater than the height of the spacer-locator slot 2503A. Similarly, in the illustrated embodiment of FIG. 26B, a semiellipsoid spacer-locator pin 2505 is integral with a first surface 2511 and sits within the spacer-locator slot 2507 of a second surface. The extruded portion of the second surface that makes up the spacer-locator pin 2505 has a height 2505A that is greater than the height of the spacer-locator slot 2507A. In alternative embodiments, spacer-locator slots of FIG. 25A, 25B, 26A, or 26B either match or do not match a profile of the spacer-locator pin and/or include pins, locks, sliders, snaps, or other retaining mechanisms to improve retention of the spacer-locators. Additionally, in one embodiment, the spacer-locator includes any of the elements disclosed in prior spacer or locator pin embodiments, such as shapes, cross sections, sizes, threading, holes, or other constructions.

Figure 27A:
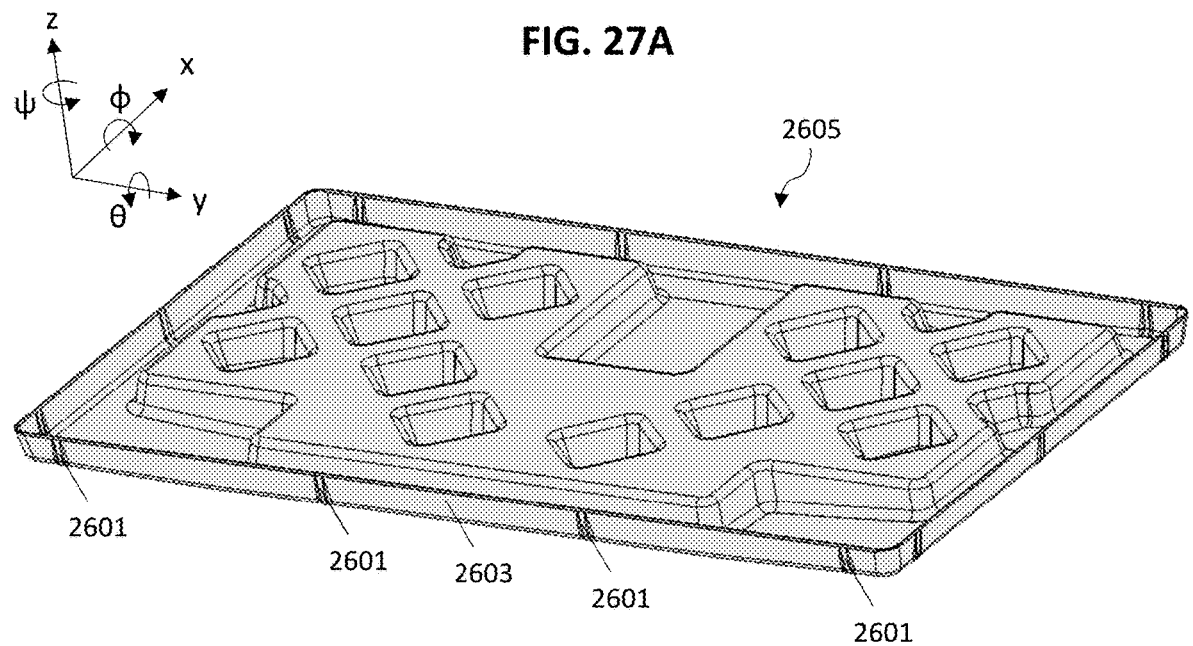
FIG. 27A illustrates a top perspective view of a door member with at least one side spacer without a locating pin according to one embodiment of the present invention.

FIG. 27A illustrates one embodiment of a spacer-locator with only spacer tabs and no locator pins. In one embodiment, at least one spacer 2601 is arranged along a surface 2603 of a door member 2605, wherein the spacers control a space between the surface 2603 and a second surface (see FIG. 27E). In one embodiment, a thickness of the spacer 2601 determines a distance between the surface 2603 and a second surface, and two or more spacers on two or more surfaces restrict rotation along one or more axes (e.g., ψ). In one multi-spacer embodiment, each of the spacers are each equal in thickness. In another embodiment, the spacers are different thicknesses. For example, spacers along a first surface are 0.5 inches (12.7 millimeters) thick, and spacers along a second surface are 0.25 inches (6.35 millimeters) thick. In another embodiment, spacers of the illustrated embodiment are matched with retaining elements such as embossed slots, sleeves, holes, or other similar constructions on a second surface, wherein the retaining elements provide positioning, locating, and support to the spacers. The spacers in this embodiment are thicker, wider, or otherwise larger than the retaining elements in order to maintain spacing between a surface on which spacer is constructed and a surface on which the retaining element is constructed. For example, in one embodiment, the retaining element is an embossed slot with a depth of 0.5 inches (12.7 millimeters), and the spacer has a depth of greater than 0.5 inches (12.7 millimeters). In another embodiment, the retaining element is cone shaped sleeve with a base diameter of 1 inch (25.4 millimeters), and the spacer is cone shaped with a base diameter greater than 1 inch (25.4 millimeters), which ensures that the conic retaining element cannot engage past the 1 inch (25.4 millimeter) diameter of the spacer and maintains space between the two surfaces.

Figure 27B:
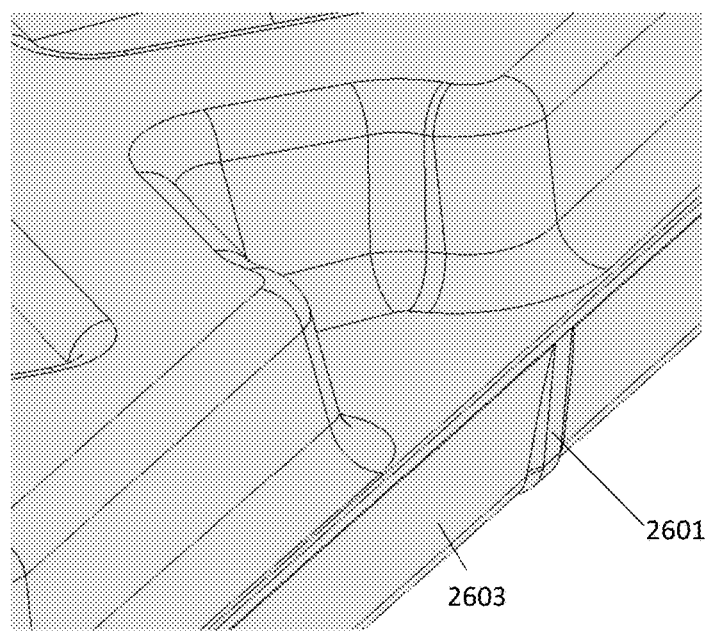
FIG. 27B illustrates a detail view of a side spacer without a locating pin according to one embodiment of the present invention.

FIG. 27B illustrates a detail view of a spacer 2601, wherein the spacer 2601 is tapered such that a slope of at least part of the spacer 2601 is steeper than that of the surface 2603 to provide thickness and separate the surface 2603 from a second surface.

Figure 27C:
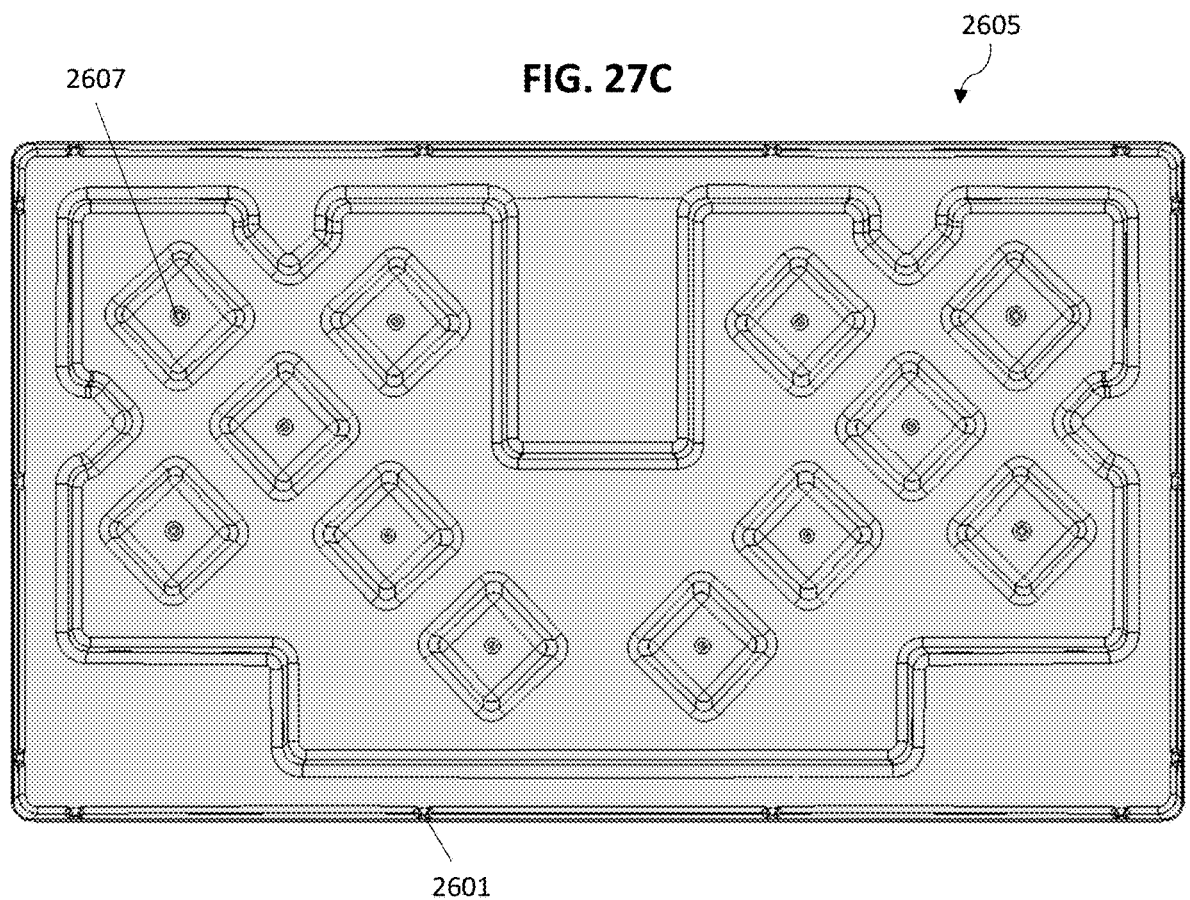
FIG. 27C illustrates a top view of a door member with at least one side spacer and at least one vertical spacer according to one embodiment of the present invention.
Figure 27D:
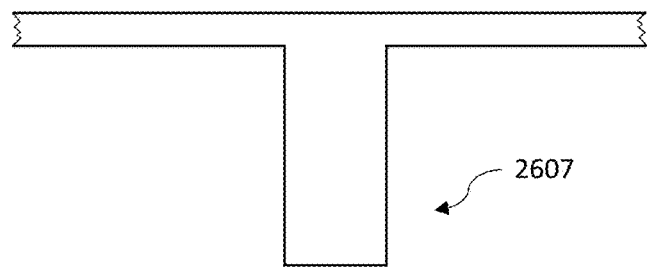
FIG. 27D illustrates a side view of a vertical spacer according to one embodiment of the present invention.

FIG. 27C illustrates a top view of a door member 2605 including spacers according to one embodiment of the present invention. Side spacers 2601 without locator pins, as illustrated in FIGS. 27A and 27B, are included as well as vertical spacer pins 2607. Vertical spacer pins 2607 are spacers that provide separation between the door member 2605 and a second surface in a similar manner to the spacer-locator pins illustrated in FIGS. 26A-26B. The vertical spacers 2607 in the illustrated embodiment extend from a bottom surface of the door member 2605. The vertical spacer pins 2607 are operable to have any shape disclosed herein for spacers and pins, including cylindrical, hemispherical, wedge shaped, or any other suitable constructions, including those with cross sections that are triangular, star, rectangle and/or any other suitable shape. FIG. 27D illustrates a side view of a spacer pin 2607 according to one embodiment of the present invention.

Figure 27E:
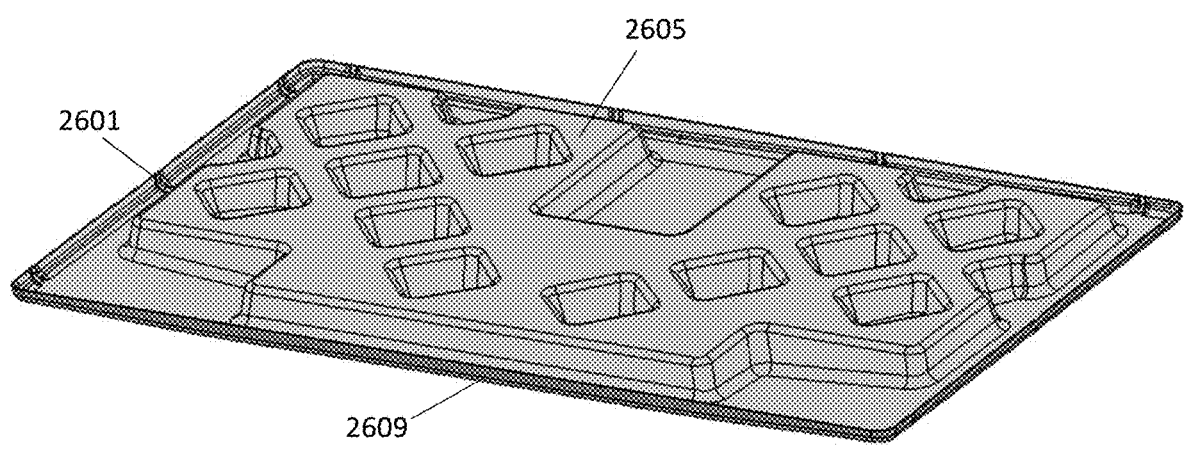
FIG. 27E illustrates a top perspective view of a door member with at least one side spacer and at least one vertical spacer, wherein the door member is inserted into a second door member according to one embodiment of the present invention.

FIG. 27E illustrates one embodiment of the door member 2605 inserted into a second door member 2609, wherein at least one side spacer 2601 and at least one vertical spacer pin both provide separation of surfaces on the door member 2605 from surfaces of the second door member 2609. In one embodiment, the second door member 2609 is only in contact with spacers and spacer pins of the door member 2601.

Figure 27F:
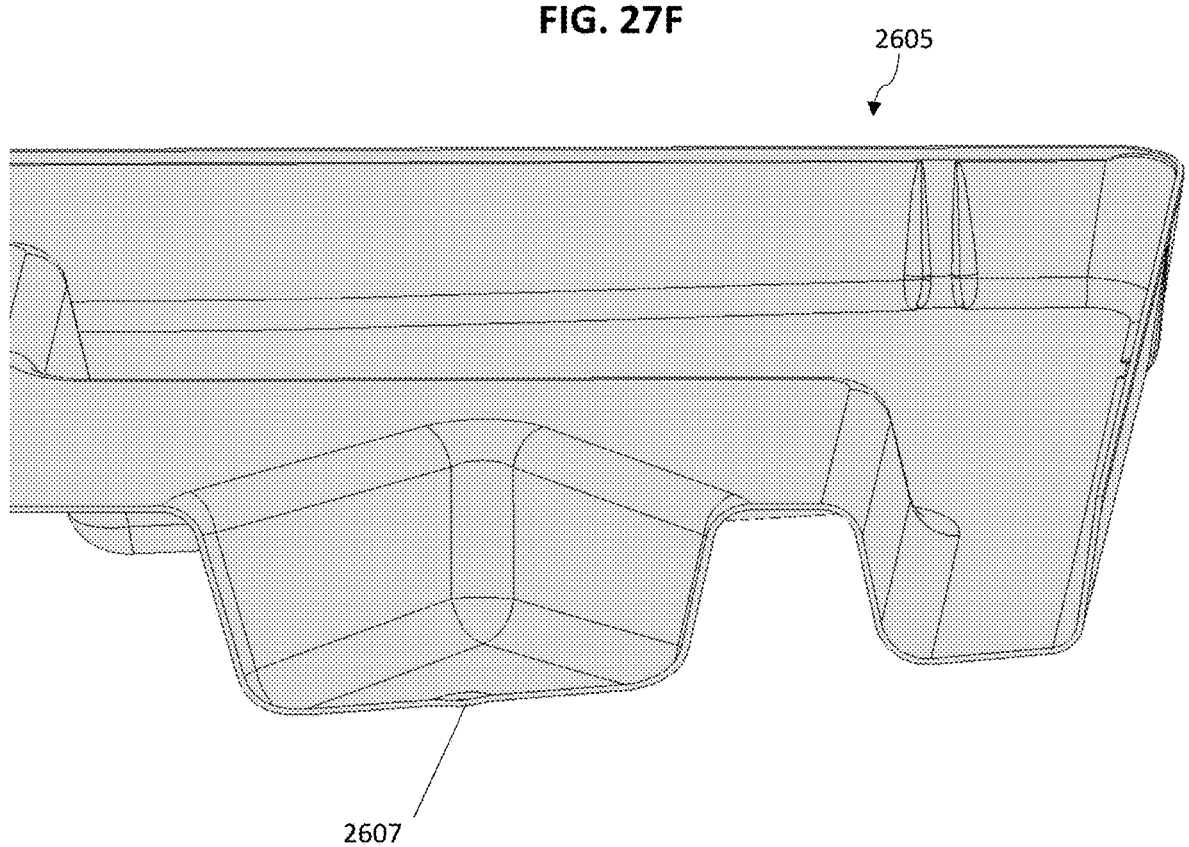
FIG. 27F illustrates a cross section view of a door member with a vertical spacer according to one embodiment of the present invention.

FIG. 27F illustrates a cross section of the door member 2605 with one embodiment of a vertical spacer 2607, wherein the vertical spacer has a rounded shape and is extends from a bottom of the door member 2605.

Each of the above disclosed spacers and pins are preferably removably or irremovably joined together or joined to a surface, a sleeve, a hole, and/or any other spacing and positioning element via physical bonding, chemical bonding, mechanical attachment, mechanical interlocking, magnetism, reversible adhesive, irreversible adhesive, welding including plastic welding, infusion, lamination, and/or vacuum attachment. Additionally, in one embodiment, horizontal spacers, vertical spacers, or any other spacers or pins are all attached or integrated with a first surface or a second surface, or not all of a plurality of spacers and pins are attached or integrated with the same surface. For example, in one embodiment, one or more spacers are integral with a first surface, and one or more additional spacers are integral with a second surface. In another embodiment, at least one first spacer tab is integral with a first mating surface of a first object or a first mating surface of a second object, wherein the at least one first spacer tab is in contact with an opposite surface of the first mating surface of the first object or an opposite surface of the first mating surface of the second object, and at least one second spacer tab is integral with a second mating surface of the first object or a second mating surface of the second object, wherein the at least one second spacer tab is in contact with an opposite surface of the second mating surface of the first object or an opposite surface of the second mating surface of the second object;

The above-mentioned examples are provided to serve the purpose of clarifying the aspects of the invention, and it will be apparent to one skilled in the art that they do not serve to limit the scope of the invention. By way of example, the spacer-locator may be different shapes. Also, by way of example, the locator pins may be different shapes and sizes to provide required strength characteristics or accommodate manufacturing processes. By its nature, this invention is highly adjustable, customizable and adaptable. The above-mention examples are just some of the many configurations that the mentioned components can take on. All modifications and improvements have been deleted herein for the sake of conciseness and readability but are properly within the scope of the present invention.

The invention claimed is:

1. A system for spacing at least two surfaces, comprising:
a first object with a first mating surface;
a second object with a second mating surface; and
at least one spacer tab with at least one locator pin;
wherein the first mating surface includes at least one locator positioning hole; and
wherein the at least one locator pin has a non-circular cross-section to prevent rotation in at least one dimension.

2. The system of claim 1, wherein the at least one spacer tab and the at least one locator pin are integral with the second mating surface.

3. The system of claim 1, wherein the at least one locator pin constrains movement of the first mating surface and the second mating surface in at least two dimensions.

4. The system of claim 1, wherein the at least one locator pin constrains rotation of the first mating surface and the second mating surface in at least two dimensions.

5. The system of claim 1, wherein the first mating surface and the second mating surface are planar or non-planar.

6. The system of claim 1, wherein the at least one spacer tab includes at least one fluid channel.

7. The system of claim 1, wherein the at least one locator pin is non-perpendicular to the first mating surface and the second mating surface.

8. The system of claim 1, wherein the at least one locator pin further includes at least two locator pins connected by the at least one spacer tab.

9. The system of claim 1, wherein the non-circular cross-section is a regular polygon or an irregular polygon.

10. A system for spacing at least two surfaces, comprising:
a first object with a first mating surface;
a second object with a second mating surface; and
at least one locator pin;
wherein the first mating surface includes at least one locator positioning hole and at least one spacer tab, and wherein the at least one spacer tab is integral with the first mating surface; and
wherein the at least one locator pin has a non-circular cross-section to prevent rotation in at least one dimension.

11. The system of claim 10, wherein the at least one locator pin is integral with the second mating surface.

12. The system of claim 10, wherein the first mating surface and the second mating surface are planar or non-planar.

13. The system of claim 10, wherein the at least one spacer tab includes at least one fluid channel.

14. The system of claim 10, wherein the at least one locator pin is non-perpendicular to the first mating surface and the second mating surface.

15. The system of claim 10, wherein the at least one locator pin further includes at least two locator pins connected by the at least one spacer tab.

16. The system of claim 10, wherein the non-circular cross-section is a regular polygon or an irregular polygon.

17. A system for spacing at least two surfaces, comprising:
a first mating surface;
a second mating surface; and
at least one locator pin;
wherein the first mating surface and the second mating surface each include at least one locator pin slot, and wherein the at least one locator pin slot restricts movement of the at least one locator pin in at least two directions; and
wherein the at least one locator pin slot restricts movement of the at least one locator pin parallel to the first mating surface and the second mating surface.

18. A system for spacing at least two surfaces, comprising:
a first object, including a first mating surface of the first object and a second mating surface of the first object;
a second object, including a first mating surface of the second object and a second mating surface of the second object;
at least one first spacer tab integral with the first mating surface of the first object or the first mating surface of the second object, wherein the at least one first spacer tab is in contact with an opposite surface of the first mating surface of the first object or an opposite surface of the first mating surface of the second object; and
at least one second spacer tab integral with the second mating surface of the first object or the second mating surface of the second object, wherein the at least one second spacer tab is in contact with an opposite surface of the second mating surface of the first object or an opposite surface of the second mating surface of the second object;
wherein the at least one first spacer tab restricts movement of the first mating surface of the first object or the first mating surface of the second object in at least one direction.

19. The system of claim 18, wherein the at least one second spacer tab restricts movement of the first object or the second object in at least one additional direction.

20. The system of claim 18, further comprising at least two first spacer tabs integral with the first mating surface of the first object or the first mating surface of the second object, wherein the at least two first spacer tabs are in contact with the opposite surface of the first mating surface of the first object or the opposite surface of the first mating surface of the second object, either individually or in combination.

21. The system of claim 20, wherein the at least two first spacer tabs restrict rotation of the first mating surface of the first object or the first mating surface of the second object in at least one direction.

\* \* \* \* \*